(12) United States Patent
St-Cyr et al.

(10) Patent No.: US 12,719,986 B2
(45) **Date of Patent: *Aug. 25, 2026**

(54) AI-BASED COMPLIANCE AND PREFERENCE SYSTEM

(71) Applicant: Thrio, Inc., Calabasas, CA (US)

(72) Inventors: Pierre St-Cyr, Laval (CA); Ran Ezerzer, Alcobendas (ES)

(73) Assignee: Nextiva, Inc., Scottsdale, AZ (US)

(*) Notice: Subject to any disclaimer, the term of this patent is extended or adjusted under 35 U.S.C. 154(b) by 121 days.

This patent is subject to a terminal disclaimer.

(21) Appl. No.: 18/783,188

(22) Filed: Jul. 24, 2024

(65) Prior Publication Data

US 2024/0380844 A1 Nov. 14, 2024

Related U.S. Application Data

(63) Continuation of application No. 18/475,043, filed on Sep. 26, 2023, now Pat. No. 12,081,701, which is a (Continued)

(51) Int. Cl.
*H04M 3/51* (2006.01)
*G06F 16/9035* (2019.01)
(Continued)

(52) U.S. Cl.
CPC ...... *H04M 3/5175* (2013.01); *G06F 16/9035* (2019.01); *G06N 20/00* (2019.01); *G06Q 30/01* (2013.01); *H04M 3/5158* (2013.01)

(58) Field of Classification Search
None
See application file for complete search history.

(56) References Cited

U.S. PATENT DOCUMENTS 7,676,034 B1 3/2010 Wu et al.
7,894,595 B1 2/2011 Wu et al.
(Continued)

FOREIGN PATENT DOCUMENTS

WO 2014081979 A1 5/2014
WO 2015148856 A9 12/2015

OTHER PUBLICATIONS

European Office Action for Patent Application Serial No. 18 878 363.3-1218; Nov. 27, 2024.
(Continued)

*Primary Examiner* — Phung-Hoang J Nguyen
(74) *Attorney, Agent, or Firm* — Spencer Fane LLP; Steven J. Laureanti

(57) ABSTRACT

A method of providing artificial intelligence (AI) functionality to target legacy customer outreach platforms of a plurality of tenant enterprises includes storing a plurality of AI templates, each of which is associated with one or more AI routines, generating a campaign object associating one or more of the AI templates with a tenant enterprise from among the plurality of tenant enterprises, transforming a communication on a switching network associated with the tenant enterprise according to the one or more AI templates associated with the campaign object, and providing the transformed communication to a target legacy customer outreach platform of the tenant enterprise.

1 Claim, 7 Drawing Sheets

Related U.S. Application Data continuation of application No. 18/114,220, filed on Feb. 24, 2023, now Pat. No. 11,805,205, which is a continuation of application No. 17/488,991, filed on Sep. 29, 2021, now Pat. No. 11,611,657, which is a continuation of application No. 16/941,416, filed on Jul. 28, 2020, now Pat. No. 11,196,861, which is a continuation of application No. 16/600,006, filed on Oct. 11, 2019, now Pat. No. 10,750,017, which is a continuation of application No. 16/192,253, filed on Nov. 15, 2018, now Pat. No. 10,530,930.

(60) Provisional application No. 62/587,786, filed on Nov. 17, 2017.

(51) Int. Cl.

*G06N 20/00* (2019.01)
*G06Q 30/01* (2023.01)

(56) References Cited

U.S. PATENT DOCUMENTS

| | | | | |
|---|---|---|---|---|
| 9,456,086 | B1 | 9/2016 | Wu et al. | |
| 2013/0110565 | A1 | 5/2013 | Means, Jr. et al. | |
| 2015/0365529 | A1 | 12/2015 | Zyarko et al. | |
| 2018/0159888 | A1* | 6/2018 | Irimie | H04W 12/122 |

OTHER PUBLICATIONS

Canadian Office Action for Patent Application Serial No. 3,082,877; Jan. 28, 2025.

* cited by examiner

10000

| CAMPAIGN OBJECT ID (10100) | TENANT ENTERPRISE ID (10200) | AI TEMPLATE(S) / WORKFLOW(S) (10300) | AGENT DATA (10400) | LIST DATA (10500) | CUSTOMER EXPERIENCE DATA (10600) | CUSTOMER OUTREACH PLATFORM DATA (10700) | DATA FEEDS (10800) | CAMPAIGN - RELATED DATA (10900) |
|---|---|---|---|---|---|---|---|---|
| | | | | | | | | |
| | | | | | | | | |
| | | | | | | | | |
| ... | ... | ... | ... | ... | ... | ... | ... | ... |
| | | | | | | | | |

FIG. 5

AI-BASED COMPLIANCE AND PREFERENCE SYSTEM

CROSS-REFERENCE TO RELATED APPLICATIONS

The present application is a continuation of U.S. application Ser. No. 18/475,043 filed Sep. 26, 2023, entitled "AI-BASED COMPLIANCE AND PREFERENCE SYSTEM", which is a continuation of U.S. application Ser. No. 18/114,220 filed Feb. 24, 2023, entitled "AI-BASED COMPLIANCE AND PREFERENCE SYSTEM", now U.S. Pat. No. 11,805,205 issued Oct. 31, 2023, which is a continuation of U.S. application Ser. No. 17/488,991 filed Sep. 29, 2021, entitled "AI-BASED COMPLIANCE AND PREFERENCE SYSTEM", now U.S. Pat. No. 11,611,657 issued Mar. 21, 2023, which is a continuation of U.S. application Ser. No. 16/941,416 filed Jul. 28, 2020, now U.S. Pat. No. 11,196,861 issued Dec. 7, 2021, entitled "AI-BASED COMPLIANCE AND PREFERENCE SYSTEM", which is a continuation of U.S. application Ser. No. 16/600,006 filed Oct. 11, 2019, now U.S. Pat. No. 10,750,017 issued Aug. 18, 2020, entitled "AI-BASED COMPLIANCE AND PREFERENCE SYSTEM", which is a continuation of U.S. application Ser. No. 16/192,253 filed Nov. 15, 2018, now U.S. Pat. No. 10,530,930 issued Jan. 7, 2020, entitled "AI-BASED COMPLIANCE AND PREFERENCE SYSTEM", which application relates to and claims the benefit of U.S. Provisional Application No. 62/587,786 filed Nov. 17, 2017, entitled "AI-BASED COMPLIANCE AND PREFERENCE SERVICE," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates to regulatory and best practice compliance for the operation of contact centers and sales and service campaign initiatives and the management of preferred communication channels for customer outreach and, more particularly, to providing artificial intelligence (AI) functionality to target legacy customer outreach platforms.

2. Related Art

Both small and large businesses rely heavily on both print and electronic advertising to attract, retain, and grow loyalty with their customers. In fact, billions of dollars each year are spent on advertising, campaign management and communications infrastructure in the form of contact center systems and digital engagement platforms to perform these duties of attracting, retaining and growing loyalty with customers.

In the process of putting together advertising campaigns, telemarketing campaigns, and even campaigns for (debts owed) collections, contact center managers are also obligated by law and compelled to ensure their customer contacts are legal and in compliance with established statutes and industry accepted best practices.

For example, one such law is enacted and enforced by the Federal Trade Commission under the auspices of protecting America's consumers. The "Telemarketing and Consumer Fraud and Abuse Prevention Act" is in force today and provides guidelines for compliance. The act prohibits deceptive telemarketing acts or practices and prohibits telemarketers from engaging in a pattern of unsolicited telephone calls that a reasonable consumer would consider coercive or an invasion of privacy. The act also restricts the hours of the day and night when unsolicited telephone calls may be made to consumers. In addition, there are separate laws specifically related to compliance with Do-Not-Call lists and regional emergency blackouts.

Various methods have been employed to either automatically or manually comply with such regulations in the contact center industry. For example, services such as DNC.com provide online access to "Do Not Call" and known litigator lists so persons operating contact centers can "scrub" or otherwise maintain proper outcall lists whilst making customer reach-outs. Such reach-outs are not limited to telephone calls. In addition to telephone calls, contact center managers also maintain similar lists for facsimile communications, SMS (text messages), and emails for example.

Interestingly, such compliance with laws and best practices for customer reach-out are a moving target. Not only are there existing federal statutes, but in addition, there are state-mandated rules as well. This makes it extremely difficult for contact center managers and the people administrating other sales and service software to stay within the letter of the law. These owners and administrators of such systems have a daunting task in ensuring these systems are in compliance. Further exacerbating the problem is the fact that most systems are not automatic, but manually updated. This makes the whole process of compliance conformance and preference management error-prone.

Particularly vexing to people managing such systems is that many manufacturers of campaign software, marketing programs, and contact center systems do not regularly update their systems for compliance. This leaves operators at a significant risk for being fined by the government or sued by customers when they fall out of compliance. In addition, the operators of such system have no way to coordinate updates between disparate systems.

The fundamental problem has several aspects: First, compliance and regulatory information is difficult to update automatically and therefore most campaigning is manual and susceptible to human error. Second, consumers have grown suspicious of phone calls that are from unknown parties or any solicitation that is not in keeping with their preferred channels or other likes or dislikes. This is a threat not only to new commerce, but also a threat in maintaining relationships with existing customers. Third, the cost of maintaining, upgrading and operating legacy infrastructure gets in the way of adapting to new and more broad laws that govern telecommunications compliance.

These problems combined are a major stumbling block in establishing best practices and good consumer relations for any operator of a contact center or administrator of broader campaign-based sales and service software.

BRIEF SUMMARY

The present disclosure contemplates various systems and methods for overcoming the above drawbacks accompanying the related art. One aspect of the embodiments of the present disclosure is a software-based, networked overlay system that provides centralized management for both inbound and outbound sales and service applications using AI (Artificial Intelligence). The system may work as a gateway along with existing predictive or progressive dialers, marketing campaign platforms, digital engagement platforms, and other service customer service environments by way of AI-enabled compliance, list management, and persona templates and automated routines. Such templates and automated routines may be connected to highly-specialized AI software engines and a decisioning software engine designed to retrofit non-AI and non-compliant systems. The system may use stored preference-based data so customers can be reached out to based on their preferred channels, demographics, sentiment, and explicit feedback. The system may use both AI and decisioning software to scan text and other data for compliance and preferences and to subsequently trigger automatic escalations, alerts, and other actions in an overlay-connected platform. In addition, the system may use AI to match credentialed customers with profiles from social media, customer relationship management (CRM) platforms, automatic call distributors (ACDs), etc. to ascertain preferred channels, demographics, and other data that can be used for intelligent routing and compliance. The system may be designed to incorporate known litigator lists, regional statutes for time-of-day and emergency restrictions, reverse directories, and other important regulatory compliance data. In addition to providing gateway and retrofitting functions for non-AI and non-compliant platforms, the system may act as a standalone platform. In its gateway role, the system can be used to retrofit a single or a plurality of existing CRM, Dialer, campaign management, digital Engagement, ACD or notification systems into a system or systems with full compliance.

In addition to this full compliance, the system may use AI templates to automatically provide instructions on what form of communication to use for each customer based on compliance conformance and preference. This may include the ability to either output scrubbed and up-loadable lists into non-compliant and non-AI enabled systems as well as the ability to "drop and insert" media streams and other data into non-compliant and non-AI enabled systems dynamically. A means to provide hosted and branded web pages, forms, and mobile applets for preference solicitation on behalf of a plurality of target enterprises is also contemplated.

Another aspect of the embodiments of the present disclosure is a system having the ability to act as a proxy or overlay network on top of existing infrastructure, this preserving previous investments in telecommunications hardware and software. An AI-based Compliance & Preference Service is designed to piggy-back on top of legacy dialers, automatic call distributors (ACDs), customer relationship management (CRM) platforms, campaign-based systems, and digital engagement platforms. This may be done through a flexible omni-channel switching and routing subsystem that can sit in-between the AI-based Compliance & Preference Service and existing systems on a plurality of networks. These networks can be PSTN, IP, MTSO or any other telecommunications network that existing systems are connected to. This aspect of the service has great utility, since it allows an existing operation to continue to run, without service disruption, whilst implementing a system-wide upgrade.

Another aspect of the embodiments of the present disclosure is a system having the ability to use Artificial Intelligence (AI) to automate a variety of tasks that were heretofore time-consuming and error-prone. These may include, but are not limited to, the ability to scan large amounts of text very quickly and do calculations on what was said, and whether what was said by an agent of the enterprise was in compliance. To the extent that similar functionality is supported by available stand-alone systems, such systems are very expensive and hard to integrate. The price of such systems is out of reach for most enterprises, especially small ones. AI is also used to ascertain specific compliance scenarios for emergency regional block-outs, customer sentiment, time of day restrictions, etc. An AI engine embedded in the AI-based Compliance & Preference Service can be programmed with "AI compliance templates" that can be stored, used and modified on an enterprise-by-enterprise basis, thus alleviating the "hit and miss" way of staying within compliance manually.

Another aspect of the embodiments of the present disclosure is a method for translation of these "AI compliance templates" and further the ability to automatically output them into "scrubbed" campaign lists, complete with consumers' names, contact information and channel preferences for use by existing campaign management systems. Such systems may be outbound dialing systems, ACDs, or sales and marketing software designed for digital engagement. The method may further include the automatic transmission of these scrubbed campaign lists to target platforms, and a method to intervene manually as well.

Another aspect of the embodiments of the present disclosure is the ability of the AI-based Compliance & Preference Service to collect, aggregate, and normalize data from a plurality of systems to create campaign lists that include (or exclude) certain information. For example, the AI-based Compliance & Preference Service can connect to National Do Not Call Databases, Litigator Databases, Regional Rules Databases, Social Media Streams, CRM records, and other data using an automated routine stored for each enterprise user of the service. This allows for an economy of scale in accessing on line databases, reverse directories, and other services that may be too expensive or complicated for smaller companies to contemplate.

Another aspect of the embodiments of the present disclosure is the ability of the AI-based Compliance & Preference Service to provide a universal means for each enterprise's customers to provide feedback and establish preferred communication methods or channels. For example, a customer may only wish to be contacted by SMS. Or another customer may only want to be contacted via phone or email. Such preferences also have other elements attached to them such as the frequency of outreach, the nature of content, and the times of day, or day of week when communications are preferred or not preferred.

Another aspect of the embodiments of the present disclosure is the use of the AI-based Compliance & Preference Service to augment voice-only or chat-only systems using an overlay network that allows enterprises to add other communications channels easily. This is achieved with a 3rd party service proxy that acts as a bridge between disparate communications channels and the overall control of disparate systems under a unifying software schema. For example, an enterprise may own an outbound dialer meant to make automatic or semi-automatic outbound calls to customers. It is often the case that such systems do not have a connected email or chat system. The AI-based Compliance & Preference Service can tie-in the scrubbed lists, customer contact channel preferences, and other data and use this information to add-on the same compliance-based software to follow-on communications that are non-voice. In this manner, the operator of a voice-only system can automatically send emails or SMS communications after or in concert with a phone call without having to buy or integrate expensive omnichannel systems.

Another aspect of the embodiments of the present disclosure is a distributed software-based system deployed as an overlay network for providing AI-based intelligence, employing pre-defined AI-based templates that can be executed on behalf of 3rd party target platforms that do not have native AI capability. Further, the system may act as an adjunct to a plurality of 3rd party target platforms, such 3rd party target platforms being comprised of ACD, dialer, CRM and digital engagement platforms that do not have or only partially possess value-added AI capability for compliance adherence and intelligent based routing and logical treatment based on preferences.

The distributed software-based system may have the ability to interface with a plurality of telecommunications networks, both for ingress and egress traffic, in order to sit in-between 3rd party target platforms using standard telecommunications connectivity, command, and control, this providing a native and non-customized means for mass connectivity to target platforms.

The distributed software-based system may have the ability to create AI-based subroutines and associated logic, and further to save these AI-based subroutines and associated logic in an AI library as pre-programmed and customizable templates for downstream incorporation into targeted, tenant-specific campaigns for the specific purpose of achieving compliance-based conformity to regulations and best practices governing customer outreach, including but not limited to intelligent routing and other logical treatment based on customer preferences, customer demographics, and customer behavior.

The distributed software-based system may have the ability to create AI subroutines and associated logic and save them in a AI library for downstream incorporation into targeted, tenant-specific campaigns for the specific purpose of applying AI classifier-based libraries for Best Time to Call (BTTC) and other constraints based on forensic patterns.

The distributed software-based system may have the ability to create AI subroutines and associated logic and save them in a AI library for downstream incorporation into targeted, tenant-specific campaigns for the specific purpose of applying AI classifier-based libraries for customer or work item prioritization based on customer lifetime value, buying volume, buying frequency, sentiment, tone, and demographic information.

The distributed software-based system may have the ability to programmatically transmit AI-based calling and or customer campaign lists using a list services gateway function that automatically formats and re-transmits data to 3rd party ACD, dialer, CRM and digital engagement platforms in a format consistent with those compatible with the target ACD, dialer, CRM and digital engagement platforms.

The distributed software-based system may have the ability to create AI subroutines and associated logic and save them in a AI BOT library for downstream incorporation into targeted, tenant-specific campaigns for the specific purpose of applying AI-based BOT (automation) with or without the inclusion of a conversation engine responding to intents and dialog response.

The distributed software-based system may have the ability to create AI subroutines and associated logic and save them in a predictive analytics library for downstream incorporation into targeted, tenant-specific campaigns for the specific purpose of applying trending, forecast patterns, campaign parameters in order to anticipate workflow logic based on predicted behavior of customers, either individually or en masse.

The distributed software-based system may have the ability to associate stored AI-based routines and templates from AI libraries and logically group them together in a named template or template library.

The distributed software-based system may have the ability to associate stored AI-based templates with specific named states and logic steps in a workflow library. In addition, the distributed software-based system may have the ability to define non-AI based decisions and logic to the same workflow library associated with specific workflows.

The distributed software-based system may have the ability to associate stored workflow library items with specific campaigns, either for outbound communications, inbound communications, or a combination of inbound and outbound communications.

The distributed software-based system may have the ability to associate stored campaign library items with specific tenants or enterprise customers and further to name and store this data in a tenant library.

The distributed software-based system may have the ability to associate agents, skills, workgroups, call lists, lead lists, customer journey data, and other attributes with a specific campaign that can be stored in a campaign library. Such data associated with agents, skills, workgroups, call lists, lead lists, customer journey data, and other attributes comprising all of the necessary logic and formatting to be used by 3rd party ACD, dialer, CRM or digital engagement platforms.

The distributed software-based system may have the ability to associate 3rd party data feeds for social firehose, CRM data, document management systems, and further all of the connectivity, password, and communication parameters necessary to communicate with these 3rd party data feeds such that all relevant data for communicating with same can be stored in a campaign library.

The distributed software-based system may have the ability to append dialing and campaign list data with attributes associated with campaign start and stop time, scheduling and other logistical data for consumption of 3rd party ACD, dialer, CRM or digital engagement systems and further the ability to store this data in a campaign library.

The distributed software-based system may have the ability to host a plurality of branded web sites and mobile applications on behalf of tenant enterprises for the collection of customer preference data that can be incorporated into AI routines and templates to govern both inbound and outbound customer outreach rules and logic.

The distributed software-based system may have the ability to collect, aggregate, and normalize data from a plurality of systems to create campaign lists that include (or exclude) relevant information that can be acted on by AI templates. For example, an AI-based compliance & preference service can connect to national do not call databases, litigator databases, regional rules databases, social media streams, CRM records, and other data using an automated routine stored for each enterprise user of the service.

Another aspect of the embodiments of the present disclosure is a non-transitory program storage medium on which are stored instructions executable by a processor to perform operations for providing artificial intelligence (AI) functionality to target legacy customer outreach platforms of a plurality of tenant enterprises. The operations may include storing a plurality of AI templates, each of which is associated with one or more AI routines, generating a campaign object associating one or more of the AI templates with a tenant enterprise from among the plurality of tenant enterprises, transforming a communication on a switching network associated with the tenant enterprise according to the one or more AI templates associated with the campaign object, and providing the transformed communication to a target legacy customer outreach platform of the tenant enterprise.

At least one of the AI routines may be selected from the group consisting of: a routing routine, a pacing routine, a compliance phrase search routine, a Best Time to Call (BTTC) routine, a customer preference prediction routine, a customer prioritization routine, a BOT conversation routine, and a predictive analytics routine.

The communication may be an outbound communication from the tenant enterprise and said transforming may include scrubbing the communication according to the one or more AI templates associated with the campaign object.

The communication may be an outbound communication from the tenant enterprise and said transforming may include ranking the communication according to the one or more AI templates associated with the campaign object.

The communication may be an outbound communication from the tenant enterprise and said transforming may include setting a communication medium for the communication according to one or more AI templates associated with the campaign object.

The communication may be an inbound communication to the tenant enterprise and said transforming may include routing the communication according to the one or more AI templates associated with the campaign object.

The operations may further include modifying a customer list according to the one or more AI templates associated with the campaign object and providing the modified list to the target legacy customer outreach platform of the tenant enterprise. Modifying the customer list may include scrubbing the customer list in accordance with data from one or more databases selected from the group consisting of: a national "do not call" database, a litigator database, and a regional rules database. Modifying the customer list may include adding customer data from one or more social media sources. Modifying the customer list may include adding customer data from one or more media sources selected from the group consisting of Twitter®, Facebook®, Twilio®, Tropo®, DataSift®, and Nylas®. The operations may further include associating the campaign object with one or more customer lists of the tenant enterprise, and the customer list that is modified may be a customer list from among the one or more customer lists of the tenant enterprise associated with the campaign object.

The operations may further include associating the campaign object with one or more agents of the tenant enterprise.

The operations may further include associating the campaign object with customer experience data of the tenant enterprise.

The target legacy customer outreach platform of the tenant enterprise may be a platform selected from the group consisting of an automatic call distributor (ACD) platform, a dialer platform, a customer relationship management (CRM) platform, and a digital engagement platform. The operations may further include associating the campaign object with a file exchange format of the target legacy customer outreach platform.

The operations may further include associating the campaign object with one or more campaign-related items of data selected from the group consisting of a communications channel of a particular outreach campaign, routing rules of a particular outreach campaign and scheduling data of a particular outreach campaign.

The operations may further include generating a generic form to be used by the plurality of tenant enterprises for input of customer preferences, branding the generic form to match a look and feel of a web site or mobile application of the tenant enterprise, and hosting the branded form to be accessed upon redirection from the web site or mobile application of the tenant enterprise. The operations may further include storing a customer input to the branded form, and the transforming of the communication may include running the one or more AI templates based on the customer input.

Another aspect of the embodiments of the present disclosure is a method of providing artificial intelligence (AI) functionality to target legacy customer outreach platforms of a plurality of tenant enterprises. The method may include storing a plurality of AI templates, each of which is associated with one or more AI routines, generating a campaign object associating one or more of the AI templates with a tenant enterprise from among the plurality of tenant enterprises, transforming a communication on a switching network associated with the tenant enterprise according to the one or more AI templates associated with the campaign object, and providing the transformed communication to a target legacy customer outreach platform of the tenant enterprise.

Another aspect of the embodiments of the present disclosure is a system for providing artificial intelligence (AI) functionality to target legacy customer outreach platforms of a plurality of tenant enterprises. The system may include a database for storing a plurality of AI templates, each of which is associated with one or more AI routines, a decisioning and workflow engine for generating a campaign object associating one or more of the AI templates with a tenant enterprise from among the plurality of tenant enterprises, an omni-channel routing and media services subsystem for receiving a communication on a switching network associated with the tenant enterprise, an AI-based compliance and preference server for transforming the communication according to the one or more AI templates associated with the campaign object, and a third party customer outreach platform server for providing the transformed communication to a target legacy customer outreach platform of the tenant enterprise.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 shows an example data structure for provisioning of AI templates, workflows, campaigns, and tenants.

DETAILED DESCRIPTION

The present disclosure encompasses various systems and methods for implementing an AI-based Compliance & Preference Service to, among other things, provide artificial intelligence (AI) functionality to target legacy customer outreach platforms. The detailed description set forth below in connection with the appended drawings is intended as a description of several currently contemplated embodiments. It is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
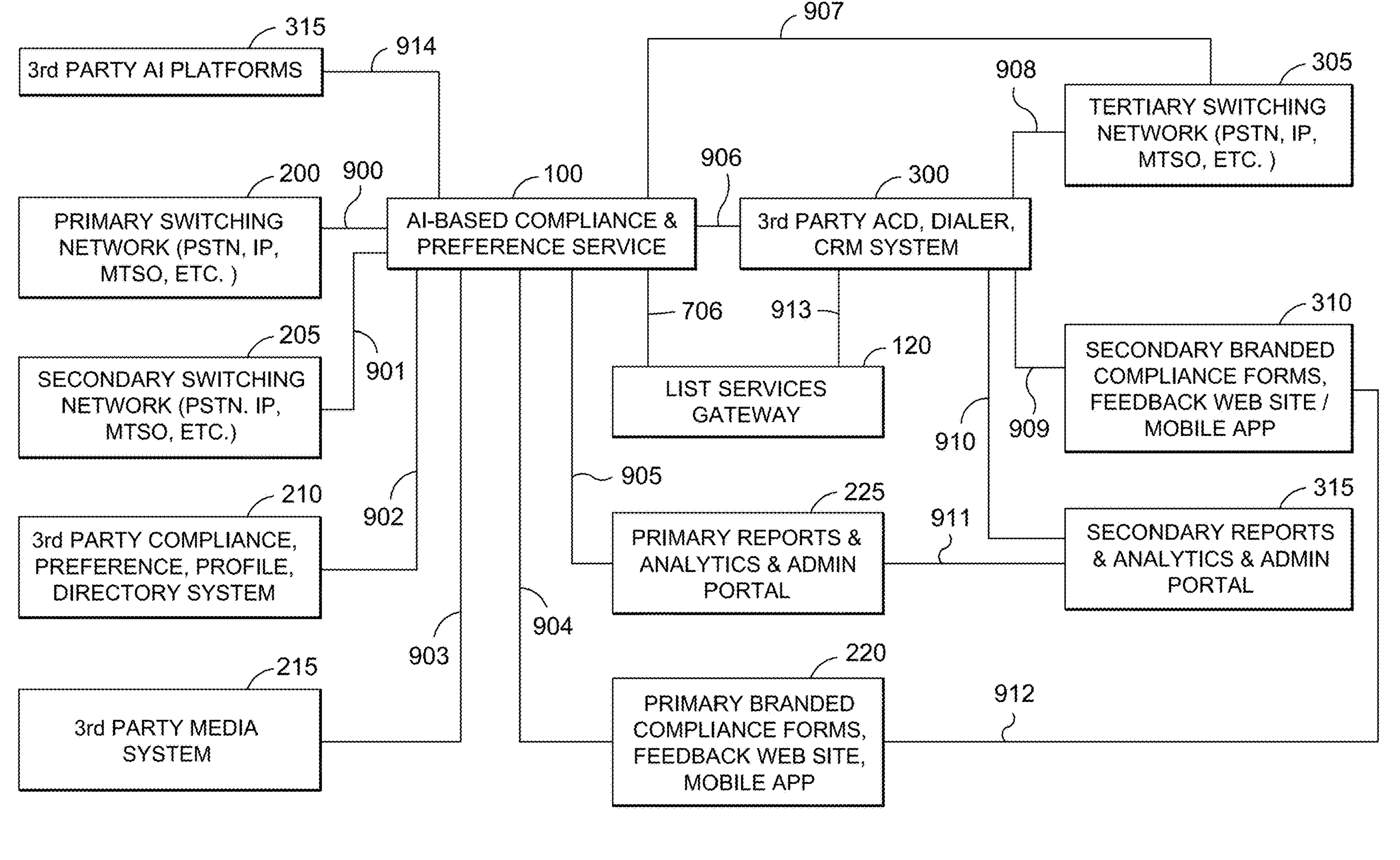
FIG. 1 illustrates the AI-based Compliance & Preference Service as an adjunct service to third party ACDs, Dialers, or CRM systems.

Referring to FIG. 1, an AI-based Compliance & Preference Service 100 may be interconnected with a plurality of telecommunications and computing networks and a plurality of 3rd party sales and customer service systems, 3rd party ACDs, 3rd party dialer systems, 3rd party CRM systems, and 3rd party digital engagement platforms. Examples of telecommunications networks may include, but are not limited to, PSTN (Public Switched Telephone Network), MTSN (Mobile Telephone Switching Networks), IP-based networks (i.e. Internet-based), and proprietary networks. Examples of computing networks may include, but are not limited to, Amazon Web Services® and Google Cloud®. Examples of sales and customer service systems may include, but are not limited to, Salesforce.com®, Oracle® RightNow Cloud Service, and Servicesoft (provided by Servicesoft Technologies Inc. of Natick, Massachusetts). ACD or dialer systems may include but not be limited to platforms such as Noble Systems® and Five9® for example. Digital engagement platforms may include but not be limited to platforms such as Marketo®, Salesloft®, Optimove®, and Adobe® as well as social media pages such as a Facebook business page.

A practitioner contemplating the creation of the AI-based Compliance & Preference Service 100 may also choose to encapsulate certain customer service and telecommunications routing functions as native capabilities. In addition, a practitioner may use some 3rd party networks and 3rd party sales and customer service systems in concert with native systems. Likewise, the AI-based Compliance & Preference Service 100 is designed to connect to a single or multiple legacy ACDs, dialer systems, etc. either directly or via the aforementioned networks. A practitioner may also wish to use several 3rd party ACDs or dialer systems in conjunction with native proprietary ACD or dialer functions. By no means does the breadth or exclusive use of 3rd party systems in connection with the AI-based Compliance & Preference Service 100 limit the overall utility thereof.

As shown in FIG. 1, 3rd party AI platforms 315 may be connected to the AI-based Compliance & Preference Service 100 via network connections or transmission methods 914. For example, the AI-based compliance & Preference Service 10 may connect to the 3rd party AI platforms 315 over the Internet using IP-based communications. Examples of protocols and standards used to connect to such platforms include, but are not limited to, HTTP, Web Services, WebHooks, and RESTful protocols. With respect to the 3rd party AI platforms 315, "AI" stands for Artificial Intelligence, a discipline in the computer programming domain that automates tasks that are normally associated with what would require human intelligence. Generally speaking, this may include the automation of concepts such as the understanding of different languages and translating between languages, decision-making, pattern and speech recognition, and visual perception (i.e. image recognition, face recognition).

Today, the ability to harness raw AI power has been somewhat commoditized through commonly available software platforms such as Api.ai, Speaktoi, or Dialogflow, provided by Google®, IBM Bluemix®, MindMeld®, platforms provided by Vital AI of New York, New York, KAI®, and Rainbird, provided by Rainbird Technologies of London, United Kingdom, for example. A software programmer with average skill may connect to such AI platforms in order to build application-specific uses for AI. It is important to note, however, that it is difficult for small and medium-sized business, in particular, to pay for and sustain the programming resources necessary to harness the power of AI for their day-to-day operations. In this regard, the disclosed embodiments make it possible to abstract practitioners of the AI-based Compliance & Preference Service 100 from the complexity and expertise required to build custom applications that can help to automate heretofore manual tasks requiring human intelligence. Thus, the disclosed embodiments may provide an easy-to-use "overlay network" that allows the practitioner to easily define AI-based routines that can be put on top of legacy systems that are already in place. The majority of systems for sales and customer service applications are devoid of AI-based capabilities, so the AI-based Compliance & Preference Service 100 can be used to retrofit these legacy systems so automated routines can be easily adapted for the needs of the business.

It is important to note that while the AI-based Compliance & Preference Service 100 may be designed in such a way that 3rd party AI platforms 315 can be used, there is no limitation in deploying the service in an alternate embodiment that would obviate the need for 3rd party AI platforms 315, instead using a proprietary (home brewed) AI software built to serve the needs of a particular enterprise. Since before the invention of cloud-based, 3rd party systems, AI software has been created for proprietary use in closed systems, dedicated to a particular enterprise and not connected for broad use via 3rd party software or services. In a preferred embodiment of the disclosed subject matter, however, multiple 3rd party AI platforms 315 would be accessed in order to expand the system's capabilities, to take advantage of competitive advancements in AI technology, and to achieve redundancy between providers in the case of failure in one 3rd party AI platform 315.

The AI-based Compliance & Preference Service 100 may further be connected to a primary switching network 200. Such a network may be comprised of, but not limited to, a single or set or multiple PSTN (Public Switched Telephone Network), IP (Internet Protocol), or MTSN (Mobile Switched Telephone Network) carriers or service providers. Examples of carriers or service providers include AT&T®, Twilio®, Level3, Flowroute®, and thinQ® to name a few. A practitioner with average skill will recognize that such carriers and service providers provide specifications and access methods for transmitting various data over these networks. These networks may act as carriage for many signals including but not limited to voice communications, SMS (short message service), email, and software instructions.

An access method or connection 900 between a primary switching network 200 and the AI-based Compliance & Preference Service 100 may be in the form of high-speed fiber connections, terrestrial data circuits (i.e. T-1 or T-3), broadband Internet connections, or wireless connections to name a few. In concert with the carriers or service providers providing service on a primary switching network 200, voice and data communications my ingress or egress to the AI-based Compliance & Preference Service 100. This ingress and egress allows for the processing of voice communications, emails, etc. in a two-way fashion, clearing the way for such communications to be combined (conferenced), transferred, terminated, or otherwise manipulated by the AI-based Compliance & Preference Service 100.

In a preferred embodiment of the disclosed subject matter, more than one set of networks can be connected to by the AI-based Compliance & Preference Service 100. For example, a secondary switching network 205 may also be connected via a communications channel or transmission method 901. This allows for the interconnection between disparate networks. For example, a voice communication may ingress from a primary switching network 200, be further processed via the AI-based Compliance & Preference Service 100, and subsequently be transferred or combined with another communication via an egress channel on a secondary switching network 205. A person possessing average skills in the area of communication network switching and routing will be familiar with the discipline of mixing or combining communication channels so communications can be connected via disparate networks. In this fashion, the AI-based Compliance & Preference Service 100 may be designed to sit in-between such networks, so communications upgraded with AI-based instructions may be "inserted" into platforms that do not have native AI capability.

Similarly, such manipulation of communication channels and transmissions by the AI-based Compliance & Preference Service 100 can happen with a tertiary switching network 305 over a communications channel or transmission method 907. There is no limit to the number of networks that can be connected to by the AI-based Compliance & Preference Service 100, whether they be standard, commercially available networks or proprietary ones.

The AI-based Compliance & Preference Service 100 may further be connected to a 3rd party ACD, dialer, or CRM system 300 (also referred to as a 3rd party customer outreach platform 300). Some modern ACDs, dialers, and CRM systems are available as so-called cloud services, accessible via commercial telephone or IP-based switching networks. Still others are CPE (Customer Premises Equipment), situated on a customer's premises or data center. Regardless of the 3rd Party ACD, dialer or CRM system 300 being cloud-based or CPE, the AI-based Compliance & Preference Service 100 may connect to such systems via one or more communications channel or transmission methods 906. In the context of a customer services environment in which telephone calls ingress to an ACD via PSTN or IP, such a connection 906 can be used to "push" telephone calls into an existing ACD or PBX (Private Branch Exchange).

For example, a phone call may originate on a primary switching network 200, get AI-based treatment at the AI-based Compliance & Preference Service 100, and then be subsequently transmitted or "pushed" to a target 3rd Party ACD, dialer or CRM system 300. Such an arrangement may be called "drop and insert" or call referral. In this fashion, a telephone call or other communication not imbued with any AI-based value-added may be transformed (e.g. according to one or more AI templates as described below) and then placed into a legacy 3rd Party ACD, dialer or CRM system 300 as if from a regular primary switching network 200, but now with AI-based treatment not previously available. Such AI-based treatment may include pre-qualified telephone calls that were "scrubbed" for compliance by the AI-based Compliance & Preference Service 100, ranking of communications according to a customer contact order, setting a communication medium (e.g. SMS, email, phone call), routing the communication, etc. In this fashion, a 3rd Party ACD, dialer or CRM system 300 may be "retrofitted" by the invention so as to expand its capabilities to include AI functions not available on the native platform. This approach is advantageous considering the expense associated with retiring and replacing imbedded or incumbent legacy systems. In no way does this example limit the scope of different types of communications (i.e. email, social, SMS, etc.) that can be deployed similarly.

As an example, AI functionality imparted by the AI-based Compliance & Preference Service 100 can be used to scan a telephone call or other communication for a customer's sentiment, tone, personality and other insights that help to characterize the state of mind of the customer. These attributes can be categorized on a customer-by-customer basis and in real time. Such attributes can be used as triggers along with decisioning software to affect an "escalation," for example, to move a dialog with a bot to a live dialog with an agent based on whether or not the customer's state of mind suggests they are getting frustrated with the bot and need to talk to a real person. In addition, these same attributes can be used as the basis for setting alarms in a supervisory panel or dashboard indicating that a customer may need to be transferred to a retention specialist or that perhaps a supervisor needs to take over. Owing to the disclosed subject matter, such AI, decisioning, and logic to decide when such triggers or alerts should occur can be provided as an "overlay" on top of a telecommunications system that does not have this capability. In this way, the AI-based Compliance & Preference Service 100 may use its intelligence to tell the non-intelligent legacy system WHEN and WHERE to effect an escalation or an alarm via an API command or some proprietary software command to the target 3rd Party ACD, dialer or CRM system 300.

At the 3rd Party ACD, dialer or CRM system 300, an additional communications channel or transmission method 908 can be connected so as to allow transmissions from the 3rd Party ACD, dialer or CRM system 300 to both ingress and egress over the aforementioned tertiary switching network 305. This depiction is not intended to limit the ability of the disclosed subject matter to be implemented in such a way that any such network, including a primary switching network 200 or secondary switching network 205, to also be connected to the 3rd party ACD, dialer, or CRM system 300 via a similar channel or transmission method 908. The depiction in FIG. 1 is for illustrative purposes so a practitioner contemplating the use of the disclosed subject matter will understand that the AI-based Compliance & Preference Service 100 may be placed either "ahead of," "behind," or in in a network "matrix" with the target 3rd party ACD, dialer, or CRM system 300 relative to a communications network.

The AI-based Compliance & Preference Service 100 may further be connected to a 3rd party compliance, preference, profile, or directory system or systems 210. These 3rd party systems 210 provide value-added services for the operators of sales and customer service operations by way of supplying lists of people's names, addresses, phone numbers and other demographic information. Such lists are used by contact center operators, dialer operations, telemarketers, and digital marketers to do a better job of identifying who to call when and with what restrictions. An average buyer of such lists or services will be familiar with companies such as PacificEast, DNC.com, or Informatica to procure same. It is typical to acquire a list or a combination of lists from these sources and then use those lists as the basis for a particular customer "reach-out" campaign. However, in most cases, these lists have to be further "scrubbed" or improved using manual routines or by manually "eyeballing" them. For many years, telemarketers and others have used software to de-duplicate these lists, to identify persons who have asked not to be called (Do Not Call), or to manually decide which person should be called first, second, third, etc. and when they should be called (e.g. what time of day, what day of the week). Accordingly, the use of such lists is typically open to human error and mistakes that could cause the enterprise in question to be open to regulatory fines or lawsuits if the lists are loaded into a campaign and do not comply with statutes or best practices.

The AI-based Compliance & Preference Service 100 may be connected to the 3rd party compliance, preference, profile, or directory system(s) 210 via a communication channel or transmission method 908. Such a connection may provide ready access to the lists and services provided by the aforementioned service providers. In a preferred embodiment of the disclosed subject matter, such lists may be identified, stored, and associated with particular tenants, as further described below in relation to FIGS. 4 and 5.

Lists obtained from 3$^{rd}$ party compliance, preference, profile, or directory system(s) 210 may be associated with particular enterprises and separated on a tenant-by-tenant basis, thus providing at least two advantages to the practitioner implementing the AI-based Compliance & Preference Service 100: First, the aggregation of these 3rd party lists by the AI-based Compliance & Preference Service 100 may allow the operator to achieve an economy of scale in the use of such lists across a plurality of tenants. By sourcing lists from 3$^{rd}$ party vendors and further using them downstream for more than one customer, the practitioner will enjoy volume-based discounts enabling her to subsequently provide favorable list rates to many tenants. Secondly, the AI-based Compliance & Preference Service 100 can apply AI-specific value-added services to each list on behalf of many tenants, acting as an application-specific "AI Service Bureau," thus alleviating the expense for each tenant to hire programming talent to both build and maintain AI-based routines and programs for each list.

It should be noted that the use of a 3rd party compliance, preference, profile, or directory system 210 does not preclude the practitioner from additionally using lists that are curated solely by the target tenant or enterprise. Similarly, there is no design restriction on the ability to use both 3rd party lists and tenant-curated proprietary lists at the same time. Accordingly, a tenant who is in control of their own 3rd party ACD, dialer, or CRM System 300 may generate lists that need to have AI treatment and transmit them to the AI-based Compliance & Preference Service 100 via the list services gateway 120 described below. In this fashion, there may be multiple sources from which the AI-based Compliance & Preference Service 100 may gain access to lists that require AI-based value-added services. For example, the AI-based Compliance & Preference Service 100 may obtain a customer list associated with a particular tenant from a 3rd party ACD, Dialer, CRM system 300 via the list services gateway 120, or from a 3rd party system 210, modify the customer list according to one or more AI templates associated with the tenant or a campaign of the tenant (e.g. scrubbing the list to comply with national "do not call," litigator, and/or regional rules databases or adding customer data from 3rd party media systems 215 described below), and provide the modified list to the 3rd party ACD, Dialer, CRM system 300.

The AI-based Compliance & Preference Service 100 may further be connected to 3rd party media systems 215. These systems may include, but are not limited to, commercially available services for short message service, social persona information, telephone switching, email services, and chat services, for example. Such services are popular and will be recognizable to the practitioner, for example, Twitter®, Facebook®, Twilio®, Tropo®, DataSift®, and Nylas® to name a few.

The AI-based Compliance & Preference Service 100 may be connected to the 3rd party media systems 215 over a communications channel or transmission method 903. Such 3rd party media systems 215 are typically operated by service providers that allow enterprises to connect using published APIs and other methods. For example, both Twilio and Twitter provide access to their services with REST-based APIs. The transmission of media is commonly achieved via the use of HTTP, FTP, RTP, and UDP, amongst many other possible protocols. Media may include phone calls, SMS transmissions, emails, or even an avatar or photograph of a person associated with a profile or demographic record. The result is a dizzying array of "big data" that would be practically impossible to further curate or "scrub" manually.

Access to such media may allow the AI-based Compliance & Preference Service 100 to combine aspects of other data, such as lists gleaned from the 3rd party compliance, preference, profile, or directory systems 210 with the data from the 3rd party media systems 215. For example, firehose data from Twitter including persona, geography, and social profile data may be combined by the AI-based Compliance & Preference Service 100 with data from acquired lists. Accordingly, available data from the 3rd party media systems 215 such as phone numbers and names can be added to records containing demographic data such as location, preferences, and social attributes. The practitioner of the AI-based Compliance & Preference Service 100 will appreciate the ability to aggregate all of this information in the same place (for each person), so that AI-based routines and templates can easily be applied to automate compliance, preference, BTTC (Best Time to Call), prioritization, and other tasks en masse. The "combining" and "scrubbing" and building of AI-based templates for all of this big data is described in more detail below with respect to FIGS. 4 and 5.

The AI-based Compliance & Preference Service 100 may further be connected to primary branded compliance forms, feedback web site/mobile app 220 via a communications channel or transmission method 904. In a preferred embodiment of the invention, the primary branded compliance forms, feedback web site/mobile app 220 may represent a hosted service, provided by the practitioner of the AI-based Compliance & Preference Service 100, where customer feedback forms, opt-in and opt-out forms, communication channel preferences, and verbatim sentiment can be shared and collected. What is contemplated here is the ability to spawn branded (yet generic) forms and input mechanisms that an enterprise (e.g. a tenant enterprise utilizing the AI-based Compliance & Preference Service 100) can make available to its customers, without having to build and host such forms on their own. Instead, the practitioner of the AI-based Compliance & Preference Service 100 will provide hosted forms that have the same look and feel as the enterprise web site or mobile application of the tenant. In this fashion, customer preference data may be stored and subsequently accessed by the AI-based Compliance & Preference Service 100 on behalf of a plurality of tenants.

A practitioner with average HTTP and JavaScript programming skills will be familiar with the practice of embedding electronic forms in an iframe or hosting forms using common CSS templates. In a preferred embodiment of the disclosed subject matter, the practitioner of the AI-based Compliance & Preference Service 100 will create, for example, JavaScript-based forms that customers can use, wherein the use of those forms involves re-directing customers from the native tenant enterprise web site over to the primary branded compliance forms, feedback web site/mobile app 220, e.g. using the same branding and color scheme of the original tenant enterprise site or mobile application. These forms can be created by a person with average skill in Web Services, HTML, or JavaScript programming. The ability to collect data from users using standard HTML forms, checkboxes, radio buttons and sliders is well known. Practitioners will recognize that an HTML form may be any text box, check box, radio button, and similar instrumentation that allows for input from a remote user. Form elements can be easily customized using inline HTML tag properties, JavaScript or CSS. Best practices for implementing forms on a web server are well known. For example, development support organizations such as the non-profit organization WebAim, UniversalClass, and Lynda.com® provide step-by-step instructions for creating forms. Accordingly, these forms can be used to create input instrumentation for both administrative use and also for the running of reports & analytics.

Based on this aspect of the disclosed subject matter, the target tenant enterprise, acting on behalf of its customers, will not have to create or maintain enterprise-wide software to collect customer preferences such as preferred communication channels or opt-in permissions. Instead, all of this preference data can be gathered automatically by the practitioner of the AI-based Compliance & Preference Service 100 as a tenant-specific service provided by the primary branded compliance forms, feedback web site/mobile app 220. Further, such gathered data can then be stored and then recalled downstream for use in either building or appending acquired lists and other data gathered as a precursor to the creation of AI template libraries as described in relation to FIG. 4. In some embodiments, such feedback mechanisms and forms may be instrumented by way of walk-up kiosk input, in-car telemetry applications, or other feedback mechanisms. Insofar as such data may be transmitted via the communications channel or transmission method 904 to the AI-based Compliance & Preference Service 100, AI libraries may be assembled regardless of the origin of the feedback and preference data. For example, feedback data from NPS (Net Promoter Score) can be downloaded from an enterprise via the communications channel or transmission method 904 to the AI-based Compliance & Preference Service 100.

The primary branded compliance forms, feedback web site/mobile app 220 may be connected to a secondary branded compliance forms, feedback web site/mobile app 310 via a communications channel or transmission method 912. This second instance of a branded compliance forms, feedback web site/mobile app is to illustrate that the invention can be implemented in such a way that the first instance 220 may act as a server to a second instance 310, which in turn may have its own peculiar branding and customized forms to serve yet another service provider acting on behalf of the target tenant enterprise. Such a sub-service provider may be a telephone company, e-commerce provider, digital engagement supplier, or operator of a sales and service or contact center infrastructure.

The secondary branded compliance forms, feedback web site/mobile app 310 may be connected to the 3rd party ACD, dialer, or CRM system 300 via a communications channel or transmission method 909 to illustrate the sub-service provider aspect of the disclosed subject matter. Here, forms and feedback mechanisms instrumented to solicit sentiment, tone, and preferences may be collected as in the case of the primary branded compliance forms, feedback web site/mobile app 220 but arranged in such a way that the captured data from the forms and other feedback mechanisms are transmitted directly into a specific 3rd party ACD, dialer or CRM system 300 which is acting on behalf of the target tenant enterprise.

The AI-based Compliance & Preference Service 100 may further be connected to a primary reports & analytics & administration portal 225. Here, a practitioner of the AI-based Compliance & Preference Service 100 may provide access to administrative tools and reporting services. Administrative tools may include an HTML/JavaScript-enabled web server for UI (User Interface) access to provisioning services. Such services may be enabled by a reports & analytics service/proxy 108 (e.g. a proxy server) as described in more detail with respect to FIG. 3. The primary reports & analytics & administration portal 225 can be created by a person with average skill in Web Services, HTML, or JavaScript programming.

As described in relation to the primary branded compliance forms, feedback web site/mobile app 220, the ability to collect data from users using standard HTML forms, checkboxes, radio buttons and sliders is well known. The primary reports & analytics & administration portal 225 may also require a means to render reports either in a tabular or graphical manner. Tools for massaging data for reporting and analytics are also well known. Software packages for achieving this are available from organizations such as Tableau Software of Seattle, Washington, Pentaho Corporation of Orlando, Florida, and Talend Inc. of Redwood City, California. These companies all provide data integration, reporting, information dashboards, and data mining BI (Business Intelligence) capabilities. As further described below in relation to FIG. 3, the AI-based Compliance & Preference Service 100 may be connected to a database service/proxy 104 and a database 105. Analytics and BI software such as Tableau®, provided by Tableau Software or Pentaho®, provided by Pentaho Corporation can be used to access stored data with which to run reports from. The use of pre-packaged BI tools to render reports and run analytics by no means limits the practitioner of the AI-based Compliance & Preference Service 100 from creating proprietary software for doing similar functions.

The primary reports & analytics & administration portal 225 may be connected to the AI-based Compliance & Preference Service 100 via a communications channel or transmission method 905. In a preferred embodiment of the disclosed subject matter, the primary reports & analytics & administration portal 225 may be a hosted service provided by the practitioner of the AI-based Compliance & Preference Service 100. Application hosting vendors such as Google® and Amazon® make the hosting of such services straightforward for the practitioner. In such an arrangement, both the primary reports & analytics & administration portal 225 and the AI-based Compliance & Preference Service 100 may be hosted in a networked or co-resident fashion, so the communications channel or transmission method 905 may be an IP-based channel provided by an application hosting vendor. In fact, all or part of the communications channels described in relation to the disclosed subject matter may be implemented in this fashion.

A practitioner of the AI-based Compliance & Preference Service 100 may provide alternative access to administrative tools and reporting services by implementing a secondary reports & analytics & administration portal 315 in addition to the primary reports & analytics & administration portal 225 described above. To this end, two additional communication channels are depicted in FIG. 1. The first communication channel or transmission method 911 may provide a connection between the secondary reports & analytics & administration portal 315 and the primary reports & analytics & administration portal 225. The second communication channel or transmission method 910 may provide a connection between the secondary reports & analytics & administration portal 315 and the 3rd party ACD, dialer, or CRM system 300. In this aspect of the disclosed subject matter, the secondary reports & analytics & administration portal 315 may be set up to act as a proxy between the AI-based Compliance & Preference Service 100 and 3rd party ACDs, dialers, or CRM systems 300. In a preferred embodiment, the secondary reports & analytics & administration portal 315 can be programmed to render reports and administrative UI in a "branded" way so as to mimic the look and feel of native reports, analytics, and administrative UI of the target ACD, Dialer or CRM System 300. In this way, the practitioner of the AI-based Compliance & Preference Service 100 can create an "overlay" network on behalf of tenant enterprises that wish to retrofit their legacy systems with the capabilities of the AI-based Compliance & Preference Service 100.

The AI-based Compliance & Preference Service 100 may further be connected to the list services gateway 120 described above. The list services gateway 120 may serve as an access portal for available AI-based lists that may be uploaded to or otherwise transmitted to a target ACD, Dialer or CRM system 300. The way in which these lists may be provisioned and stored is described in more detail in relation to FIGS. 4 and 5. Any person with general knowledge of ACD, Dialer, or CRM systems will recognize that sales, service, and marketing campaigns frequently require the processing of lists to perform functions such as loading outbound dialing instructions, scheduling outbound emails to a list of email addresses, or transmitting customized SMS messages. The types of media channels used for such lists, both for ingress and egress, are quite diverse. These lists are typically filtered or "scrubbed" off line and manually curated. Common methods for consuming these lists by ACD, Dialer or CRM systems is by uploading a CSV (comma separated value) file into the target system. Once loaded, the named fields of these files are viewed by an operator in an administrative UI, whereupon the essential fields and/or objects are chosen and then stored by the target system for use in a campaign.

In a preferred embodiment of the disclosed subject matter, the AI-based Compliance & Preference Service 100 can be used to pre-define the format, fields, objects, etc. required by the target ACD, Dialer, or CRM system 300 in use at the target tenant enterprise. In this way, the list services gateway 120 can be used to automatically transmit AI-enhanced lists to the target ACD, Dialer, or CRM systems 300 so that no manual intervention, or very little manual intervention, is required. Two communication channels are depicted in FIG. 1 that are associated with the list services gateway 120. The first communication channel or transmission method 706 may provide a connection between the AI-based Compliance & Preference Service 100 and the list services gateway 120. The second communication channel or transmission method 913 may provide a connection between the list services gateway 120 and the 3rd Party ACD, Dialer, or CRM system 300. This further illustrates how the disclosed subject matter can be deployed by the practitioner of the AI-based Compliance & Preference Service 100 as an "overlay" network on behalf of tenant enterprises that wish to retrofit their legacy systems with the capabilities of the AI-based Compliance & Preference Service 100.

Figure 2:
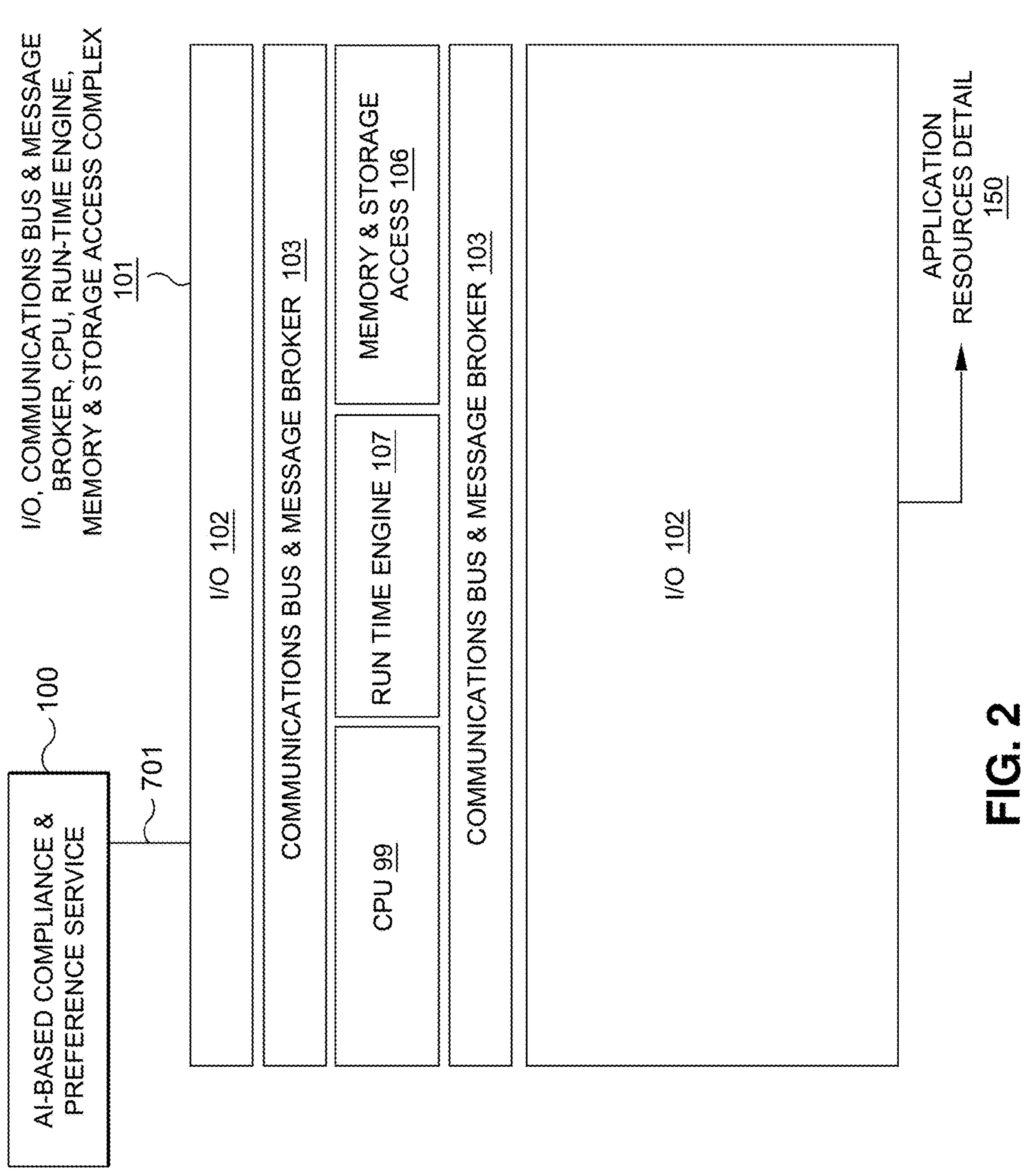
FIG. 2 is a detailed view of components of the AI-based Compliance & Preference Service that are used to access application resources, including depictions of I/O, Communications Bus & Message Broker, CPU, Run-Time Engine, Memory, and Storage Access.

FIG. 2 depicts an I/O, communications bus & message broker, CPU, run-time engine, memory & storage access complex 101 (also referred to as computing and networking complex 101) that may serve as an overall computing environment supporting the AI-based Compliance & Preference Service 100. The AI-based Compliance & Preference Service 100 can be implemented as a collection of application software and routines that may require I/O, messaging and brokering, memory, CPU and run time engine resources. Such software applications can be implemented using proprietary software instructions and operating systems, but skilled practitioners of software and computing environments will be familiar with commonly available tools to implement a service of this nature.

In modern computing and networking environments, software-based applications may have access to each other through an API (application programming interface) framework, such as the Java-based RESTful web API framework called Restlet. Similarly, systems such as a Spring-based RESTful web service may be deployed. In a preferred embodiment of the disclosed subject matter, the CPU, Run-Time Environment/Engine (RTE), communications bus and message broker, etc. can be highly distributed using micro-services each encapsulating their own run time engine, hardware, communication connections, etc. These can be orchestrated by using commercially available load balancing and orchestration software such as NGINX® or Kubernetes®. In particular, the AI-based Compliance & Preference Service 100 may be dependent on such a computing and networking complex 101. In an alternate embodiment of the invention, all or part of the computing and networking complex 101 used to build a suitable computing environment can be achieved with proprietary methods, or with a collection of hardware and software that is not distributed or cloud-based. The utility of the disclosed subject matter does not necessarily depend on the actual placement and topology of the computing environment elements.

The computing and networking complex 101 may include an I/O element 102. I/O (or IO) is an acronym for "input/output." In the context of computing environments, I/O applies to devices, operations, and programs that transfer data between computer devices and peripheral devices. Data being transferred may be an "Input" from one device to another or an "output" from one device to another. I/O is also associated with wired or wireless hardware that provides standard connectivity to I/O, for example, RJ-45 connectors for Ethernet connections, or a USB plug for peripheral devices.

The computing and networking complex 101 may include a communications bus & message broker 103. In a computer-based, networked environment, a bus is a communication system that transfers data between components inside a computer, or between computers. The physical medium that may carry such communications may include optical fiber, copper pairs, or coaxial cable. The protocols governing the communication over the bus may be IP-based (Internet Protocol) or a proprietary protocol. Examples of communication busses include Fire Wire, USB, and other well-known schemes. In addition, there is communication message broker software available to help govern the flow of information over busses. Such software may include, but is not limited to, systems such as Apache Kafka or RabbitMQ, both commonly used by practitioners skilled in the discipline of distributed computing.

The computing and networking complex 101 may include a CPU element 99. The CPU is the Central Processing Unit of a computer. It may also be referred to as a microprocessor or processor. A CPU may call upon stored instructions called a "program" to execute a sequence of commands. Depending on the amount of compute power required for a certain application, a plurality of CPUs may be deployed. This is often called virtualization, referring to the idea that in a highly distributed computing environment CPUs can be ganged together on high-density circuit boards hosting multiple CPUs.

The computing and networking complex 101 may include a runtime engine (RTE) element 107. Software applications may rely on a RTE to execute commands, allowing applications to run or execute in a computer. RTEs may be designed to convert application-specific routines, manifest in a computer-read language, into a language that the hardware (machine) can understand (machine language). RTE is often associate with operating environments, like an operating system. However, RTEs may be created as application-specific software, more akin to an application runtime environment. An example of a run time engine for Java programs would be the Java Virtual Machine. An example of a runtime environment for JavaScript is Node.js.

The computing and networking complex 101 may include a memory & storage access element 106. Computer-based memory is a device that can store needed computer information either permanently or temporarily. This is often referred to as "volatile" memory or RAM (Random Access Memory). RAM can store information that can readily be digested by specific hardware, operating systems, and application software. Further, such memory can be structured to cache information in a specific format so other programs, processes, and devices can access the information easily. There are a variety of RAM and data structure storage products available to practitioners of the AI-based Compliance & Preference Service 100. These include, for example, the open-source Redis (developed by Salvatore Sanfilippo) and cloud-based offerings such as mongoDB Atlas (provided by MongoDP Inc.).

The above-mentioned computer programs may be provided to the memory & storage access element 106 by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computing and networking complex 101 via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

Figure 3:
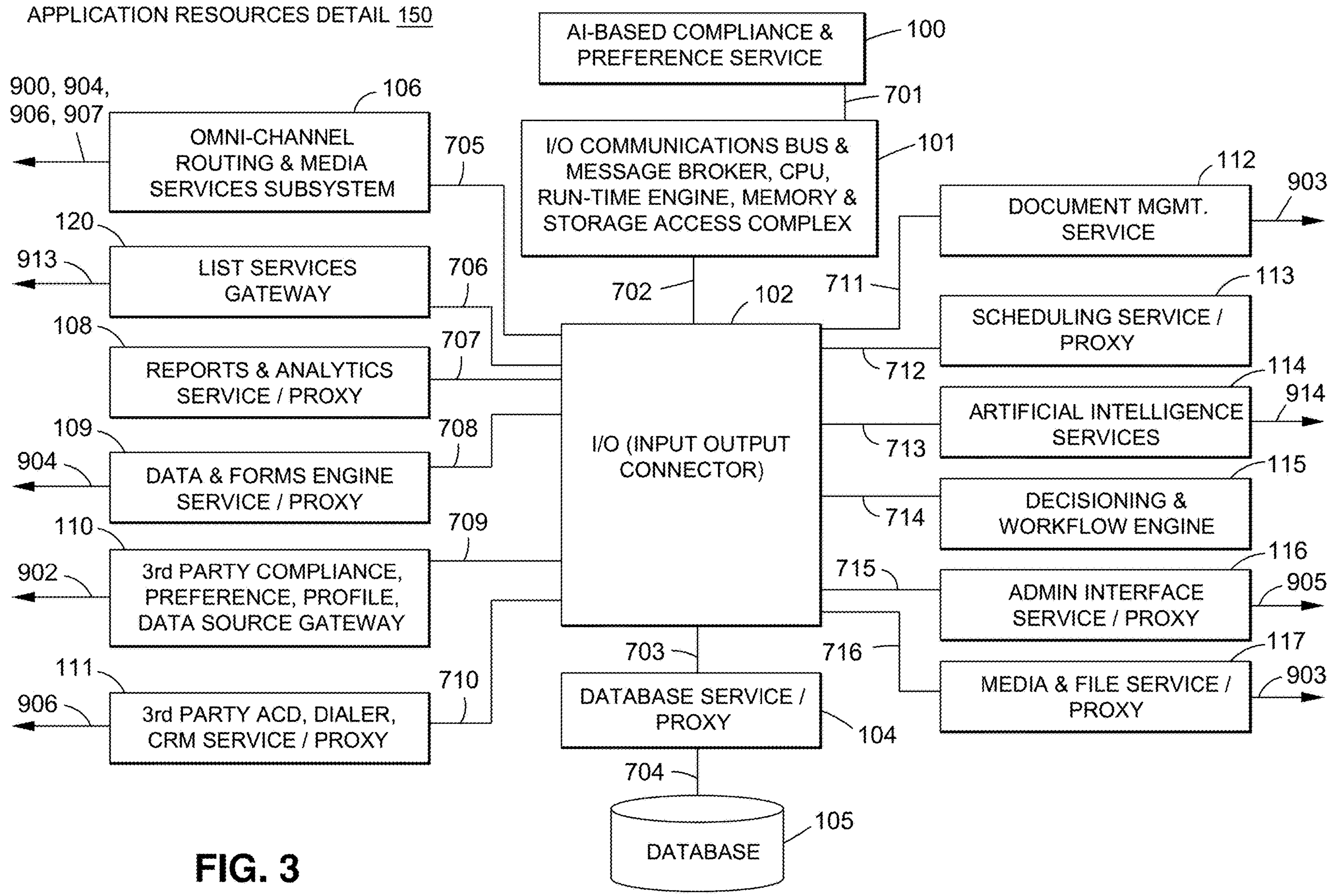
FIG. 3 is a detailed view of application resources used by the AI-based Compliance & Preference Service.

FIG. 3 is a detailed view of application resources that may be used by the AI-based Compliance & Preference Service 100, illustrated as application resources detail 150. Here, a plurality of micro-services, or servers, are orchestrated so as to provide particular functions to the AI-based Compliance & Preference Service 100. As shown, in a preferred embodiment, the computing and networking complex 101 may be used by the AI-based Compliance & Preference Service 100 as a means to access and control application resources as shown in FIG. 3.

The AI-based Compliance & Preference Service 100 may access an omni-channel routing & media service subsystem 106 (e.g. via the computing and networking complex 101). The purpose of the omni-channel routing & media services subsystem 106 is to provide telecommunications switching and control services. As an example, the omni-channel routing & media services subsystem 106 may be comprised of a collection of PBX (Private Branch Exchange) or ACD (Automatic Call Distributor) software that is commonly available. For example, open-source software is available from FreeSWITCH and Asterisk (developed by Digium, Inc.) to implement telecommunications switching services.

Likewise, access to other messaging channels can be added here via services from companies such as Twilio and Cisco. For a practitioner with average skill in the area of telecommunications software, the implementation of such services is straightforward. Of particular relevance to the disclosed subject matter is the ability of the omni-channel routing & media services subsystem 106 to be programmed so that the switching and transmission of various media can be done on a tenant-by-tenant basis. For example, the omni-channel routing & media services subsystem 106 may be used to "drop and insert" media streams (telephone calls, chats, emails, etc.) into the front end of a 3rd party ACD, dialer, or CRM system 300 as an "overlay" network as described in relation to FIG. 1.

For example, outbound telephone calls may be generated by the AI-based Compliance & Preference Service 100 and transmitted via the omni-channel routing & media services subsystem 106. Such outbound phone calls can further be "pushed" into a 3rd party ACD, dialer, or CRM system 300 using pre-filtered or "scrubbed" lists that have received the AI-based value-added of the invention. The transmission of such media may be conducted via communication channels and transmission methods 900, 901, 906, and 907. As shown in FIG. 1, these channels may be connected downstream to the primary switching network 200, secondary switching network 205, 3rd party ACD, dialer, or CRM system 300, and tertiary switching network 305, respectively. In addition, the omni-channel routing & media services subsystem 106 may be connected to the AI-based Compliance & Preference Service 100 via a communication and transmission channel 705 to the I/O 102. The omni-channel routing & media services subsystem 106 may also contain subroutines including routing algorithms, pacing algorithms, and service attributes associated with agent skills, assignments between queues, work items, users, AI-based instructions, rules for escalations, and caller patterns.

In a preferred embodiment of the disclosed subject matter, the omni-channel routing & media services subsystem 106 may send commands to the primary switching network 200, secondary switching network 205, 3rd party ACD, dialer, or CRM system 300, and tertiary switching network 305 by way of parameter settings accessible via an administrative interface service/proxy 116 as described below.

The AI-based Compliance & Preference Service 100 may access the list services gateway 120 as also depicted in FIG. 1. The list services gateway 120 may be connected to the AI-based Compliance & Preference Service 100 via a communication and transmission channel 706 to the I/O 102. In addition, the 3rd party ACD, dialer, or CRM system 300 may be connected to the list services gateway 120 via a communication and transmission channel 913.

In a preferred embodiment of the disclosed subject matter, the list services gateway 120 may transmit AI-based lists to the 3rd party ACD, dialer, or CRM system 300, the attributes of which will be defined by way of parameter settings accessible via the administrative interface service/proxy 116 as described below.

The AI-based Compliance & Preference Service 100 may access a reports & analytics service/proxy 108. The reports & analytics service/proxy 108 may be connected to the AI-based Compliance & Preference Service 100 via a communication and transmission channel 707 to the I/O 102. As described above with reference to FIG. 1, the AI-based Compliance & Preference Service 100 may be connected to the primary reports & analytics & admin portal 225 via a communication and transmission channel 905. In this fashion, the AI-based Compliance & Preference Service 100 may act as a proxy for the reports & analytics service/proxy 108 in offering services (e.g. as a micro-service) to the primary reports & analytics & admin portal 225. The same proxy arrangement may be true of the relationship between the reports & analytics service/proxy 108 and the primary branded compliance forms, feedback web site/mobile app 220. That is to say that the AI-based Compliance & Preference Service 100 may act as a proxy for the reports & analytics service/proxy 108 in offering services (e.g. as a micro-service) to the primary branded compliance forms, feedback web site/mobile app 220.

In a preferred embodiment of the disclosed subject matter, the reports & analytics service/proxy 108 may compile information stored in the database 105 as described below. The way in which the data is assembled for downstream reports and analytics may be defined by way of parameter settings accessible via the administrative interface service/proxy 116 as described below.

The practitioner of the AI-based Compliance & Preference Service 100 may consider that the functions provided by the reports & analytics service/proxy 108 may be collapsed into either or both of the primary branded compliance forms, feedback web site/mobile app 220 and/or the primary reports & analytics & admin portal 225. The functions of the reports & analytics service/proxy 108 are broken out here to illustrate how a tiered and distributed service may be implemented. The disclosed subject matter may be viably implemented whether these services are distributed or collapsed.

The AI-based Compliance & Preference Service 100 may access a data & forms engine service/proxy 109. The data & forms engine service/proxy 109 may be connected to the AI-based Compliance & Preference Service 100 via a communication and transmission channel 708 to the I/O 102. In a preferred embodiment of the disclosed subject matter, the data & forms engine service/proxy 109 may be connected to the primary branded compliance forms, feedback web site/mobile app 220 as described above in relation to FIG. 1, via the communications channel and transmission method 904. The way in which the data is assembled for downstream compliance forms and feedback may be defined by way of parameter settings accessible via the administrative interface service/proxy 116 as described below.

The AI-based Compliance & Preference Service 100 may access a 3rd party compliance, preference, profile, data source gateway 110. The 3rd party compliance, preference, profile, data source gateway 110 may be connected to the AI-based Compliance & Preference Service 100 via a communication and transmission channel 709 to the I/O 102. In a preferred embodiment of the disclosed subject matter, the 3rd party compliance, preference, profile, data source gateway 110 may be connected to the 3rd party compliance, preference, profile, directory systems 210 as described above in relation to FIG. 1, via the communications channel and transmission method 902. Connections to 3rd party compliance, preference, profile, directory systems 210 (URLs, IP addresses, connection parameters, etc.) may be defined by way of parameter settings accessible via the administrative interface service/proxy 116 as described below.

The AI-based Compliance & Preference Service 100 may access a 3rd party ACD, dialer, CRM service/proxy 111 (also referred to as a 3rd party customer outreach platform server 111). The 3rd party ACD, dialer, CRM service/proxy 111 may be connected to the AI-based Compliance & Preference Service 100 via a communication and transmission channel 710 to the I/O 102. In a preferred embodiment of the disclosed subject matter, the 3rd party ACD, dialer, CRM service/proxy 111 may be connected to the 3rd party ACD, dialer, or CRM System 300, as described in FIG. 1, via the communications channel or transmission method 906. Connections to the 3rd party ACD, dialer, or CRM system 300 (URLs, IP addresses, connection parameters, DNIS numbers, data circuits, telephone circuits, etc.) may be defined by way of parameter settings accessible via the administrative interface service/proxy 116 as described below.

The AI-based Compliance & Preference Service 100 may access a document management service 112. The document management service 112 may be connected to the AI-based Compliance & Preference Service 100 via a communication and transmission channel 711 to the I/O 102. In a preferred embodiment of the disclosed subject matter, the document management service 112 may act as a micro-service always accessible to the AI-based Compliance & Preference Service 100. The identification and access to certain documents, media and other data (knowledge base articles, avatars, etc.) may be defined by way of parameter settings accessible via the administrative interface service/proxy 116 as described below. Practitioners will recognize that a variety of software programs for storing and accessing documents, called document management systems, are commonly available. For example, OpenKM and SeedDMS are popular software packages that provide document and record management, workflow support, and full text search. Alternatively, the practitioner of the AI-based Compliance & Preference Service 100 may use proprietary document management systems provided by companies such as IntelliResponse and Synthetix.

The AI-based Compliance & Preference Service 100 may access a scheduling service/proxy 113. The scheduling service/proxy 113 may be connected to the AI-based Compliance & Preference Service 100 via a communication and transmission channel 712 to the I/O 102. In a preferred embodiment of the disclosed subject matter, the scheduling service/proxy 113 may act as a micro-service always accessible to the AI-based Compliance & Preference Service 100.

System-related and campaign-related timers and schedules may be identified and accessed here. The practitioner of the AI-based Compliance & Preference Service 100 may define schedules for system-wide use and campaign use by way of parameter settings accessible via the administrative interface service/proxy 116 as described below. Persons familiar with JavaScript will recognize commonly available JavaScript tools to implement scheduling functions, for example, the ExtScheduler from Brynthum and Schedule.js.

The AI-based Compliance & Preference Service 100 may access artificial intelligence services 114. The artificial intelligence services 114 may be connected to the AI-based Compliance & Preference Service 100 via a communication and transmission channel 713 to the I/O 102. In a preferred embodiment of the disclosed subject matter, the artificial intelligence services 114 may act as a micro-service always accessible to the AI-based Compliance & Preference Service 100. The purpose of the AI-based Compliance & Preference Service 100 may be, in part, to connect to and assemble AI-based queries offered by 3rd party AI platforms 215 as described above in relation to FIG. 1. As noted above, AI platforms are commonly available from 3rd parties such as Google api.ai, IBM bluemix, MindMeld, Vital A.I., KAI, and Rainbird. The identification and access parameters for connections to 3rd party AI services may be provided by the artificial intelligence services 114. In addition, AI queries and templates may be run here in the artificial intelligence services 114.

The practitioner of the AI-based Compliance & Preference Service 100 may further define specific AI instructions schedules for campaign use by way of parameter settings accessible via the administrative interface service/proxy 116 as described below. Persons familiar with AI modeling will recognize commonly available programming tools to deploy in the artificial intelligence services 114. For example, the Bonsai AI Engine and Inkling programming language provide the structure for programmers to generate and train AI models, independent of 3rd party backend algorithms, libraries, or services.

The AI-based Compliance & Preference Service 100 may access a decisioning & workflow engine 115. The decisioning & workflow engine 115 may be connected to the AI-based Compliance & Preference Service 100 via a communication and transmission channel 714 to the I/O 102. In a preferred embodiment of the disclosed subject matter, the decisioning & workflow engine 115 may act as a micro-service always accessible to the AI-based Compliance & Preference Service 100. System-related and campaign-related rules, workflow and decision logic may be identified and accessed here. The practitioner of the AI-based Compliance & Preference Service 100 may define workflows, decisions and rules for system-wide use and campaign use by way of parameter settings accessible via the administrative interface service/proxy 116 as described below. Persons familiar with rules-based systems and workflow will be familiar with both open-source and commercially available software for decisioning and workflow. For example, Gandalf, Drools (developed by Red Hat, Inc.), and business ruler engines provided by Actico may all provide a suitable environment for implementing such a micro-service. The AI-based Compliance & Preference Service 100 may make use of the decisioning & workflow engine 115 by way of defining specific logic flows, such as decisions for when a BOT (automation) dialog should be escalated to a live person, and routing logic for when calls can be made to a certain region, as well as how to prioritize customer lists for outreach based on AI-assisted information.

The AI-based Compliance & Preference Service 100 may access the administrative interface service/proxy 116 as referenced above in relation to various services of the application resources detail 150. The administrative interface service/proxy 116 may be connected to the AI-based Compliance & Preference Service 100 via a communication and transmission channel 715 to the I/O 102. The purpose of the administrative interface service/proxy 116 may be to provide a programmatic interface for rules, parameters, AI queries, campaign templates, tenant attributes, skills, agents, groups, etc. to be created and saved for downstream use by the AI-based Compliance & Preference Service 100. In this regard, FIG. 4, discussed in more detail below, provides a detailed description of how the provisioning of templates, workflows, campaigns, and logic flow may be achieved. All of this input may be facilitated via an administrative interface governed and hosted by the administrative interface service/proxy 116.

The administrative interface service/proxy 116 may also be connected to the primary reports & analytics & admin portal 225 via the communication and transmission channel 905 as described previously in relation to FIG. 1. In this regard, it is noted that the descriptions in relation to FIG. 1 of how user-facing forms, report generation, and feedback mechanisms can be implemented in the primary reports & analytics & admin portal 225 may also apply to the administrative interface service/proxy 116. In an alternate embodiment of the invention, the functions of both the administrative interface service/proxy 116 and the primary reports & analytics & admin portal 225 may be collapsed into one service. The functions of the administrative interface service/proxy 116 are broken out here to show the practitioner of the AI-based Compliance & Preference Service 100 how a tiered and distributed service may be implemented. The disclosed subject matter may be viably implemented whether these services are distributed or collapsed.

The AI-based Compliance & Preference Service 100 may access a media & file service/proxy 117. The media & file service/proxy 117 may be connected to the AI-based Compliance & Preference Service 100 via a communication and transmission channel 716 to the I/O 102. In a preferred embodiment of the disclosed subject matter, the media & file service/proxy 117 may act as a micro-service always accessible to the AI-based Compliance & Preference Service 100. The identification and access to certain files, objects and other media, e.g. containing parameter data, binary large objects (Blobs), JavaScript Objects (JSON) etc., may be defined by way of parameter settings accessible via the administrative interface service/proxy 116. Practitioners of the AI-based Compliance & Preference Service 100 will recognize that a variety of software programs and services for caching, storing and accessing configuration data, customer data, etc., for example, Atlas Mongo DB, is commonly used for such purposes.

The media & file service/proxy 117 may also be connected via a communications and transmission method 903 to the 3rd party media services 215 as described in relation to FIG. 1. In a preferred embodiment of the disclosed subject matter, the media & file service/proxy 117 may access the 3rd party media services 215 to retrieve customer-owned attributes, such as those available from Twitter or Facebook regarding social profiles. As described above in relation to FIG. 1, a plurality of media services may be accessed in order to assemble the requisite data that the artificial intelligence services 114 and decisioning & workflow engine 115 will consume in their role of defining and creating instructional templates and campaign-related data that may be associated with tenant enterprises and campaigns. The logical steps for assembling these templates and campaigns are described below in relation to FIG. 4.

In an alternate embodiment of the disclosed embodiments, the functions of both the media & file service/proxy 117 and the document management service 112 may be collapsed into one service. Their functions are broken out here to show the practitioner of the AI-based Compliance & Preference Service 100 how a tiered and distributed service may be implemented. The disclosed subject matter may be viably implemented whether these services are distributed or collapsed.

As noted above, the AI-based Compliance & Preference Service 100 may be connected to a database service/proxy 104 and a database 105. The database service/proxy 104 may be connected to the AI-based Compliance & Preference Service 100 via a communication and transmission channel 703 to the I/O 102. The purpose of the database service/proxy 104 may be to send and receive data for storage in the database 105, as described below. In a preferred embodiment of the disclosed subject matter, the database service/proxy 104 may be implemented as a micro-service. A practitioner of the AI-based Compliance & Preference Service 100 may implement such a service to provide caching and buffering services to reliably shuttle information back and forth between the AI-based Compliance & Preference Service 100 and the database 105. For example, a JavaScript programmer may use node.js and its buffer class to implement a mechanism for manipulating or reading binary data streams. Mozilla.org also explains how the use of the ArrayBuffer object may be helpful in such circumstances. Alternatively, buffering can be done using Atlas Mongo DB as described previously.

As for the database 105, the practitioner may use a local hard disk and associated database software to store system data. Alternatively, the database 105 can be deployed using cloud-based database services such as Amazon S3 or Google Cloud Storage. The database 105 may be connected to the database service/proxy 104 via a communication and transmission channel 704. In an alternate embodiment, both the database 105 and the database service/proxy 104 may be collapsed into one function. This may be contemplated owing to the inherent buffering capabilities some service providers such as Amazon and Google may provide. The disclosed subject matter may be viably implemented whether these services are distributed or collapsed.

Figures 4, 4A:
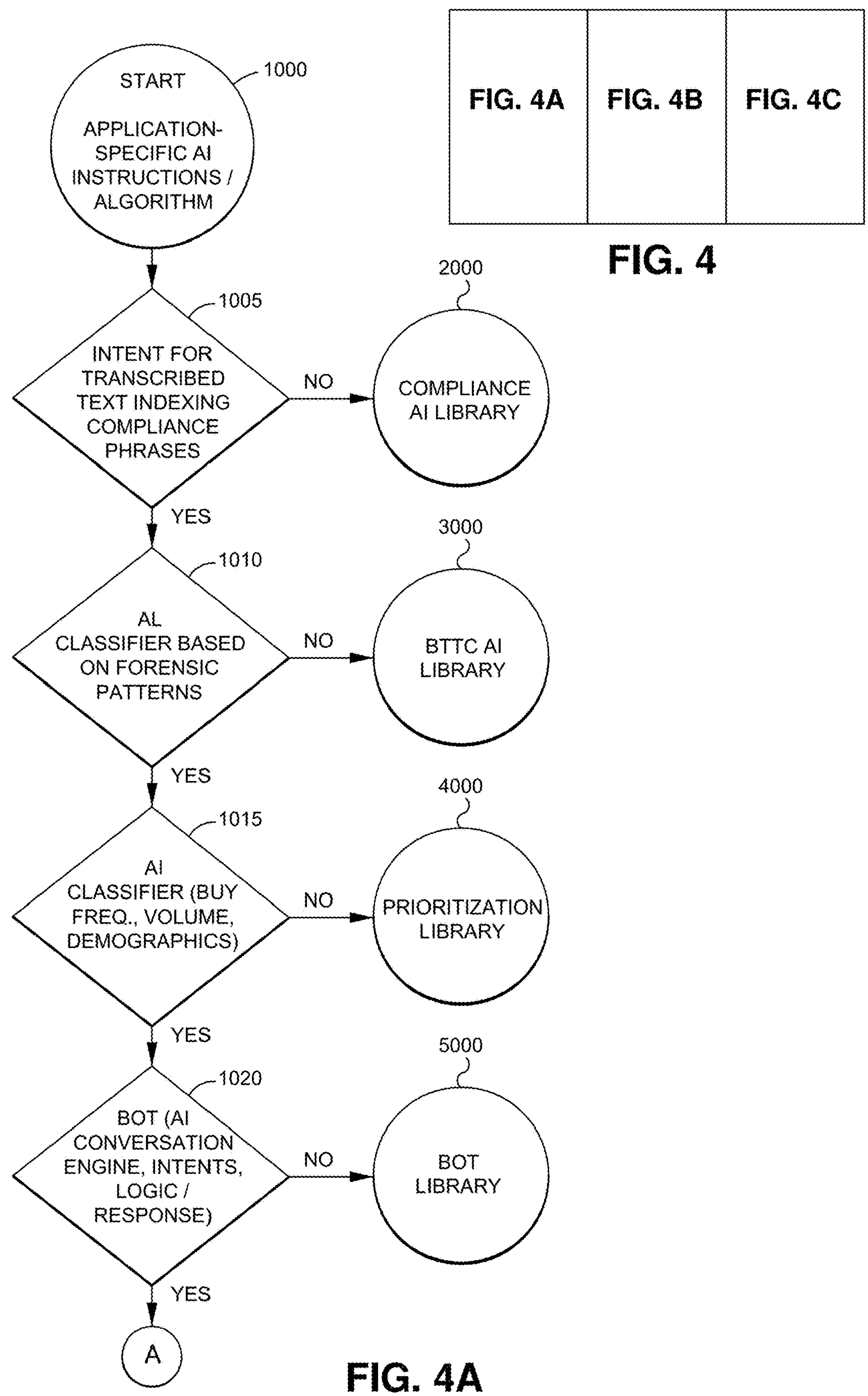
FIG. 4, which is split into FIGS. 4A, 4B, and 4C as illustrated, shows an example logic flow for provisioning of AI templates, workflows, campaigns, and tenants.
Figure 4B:
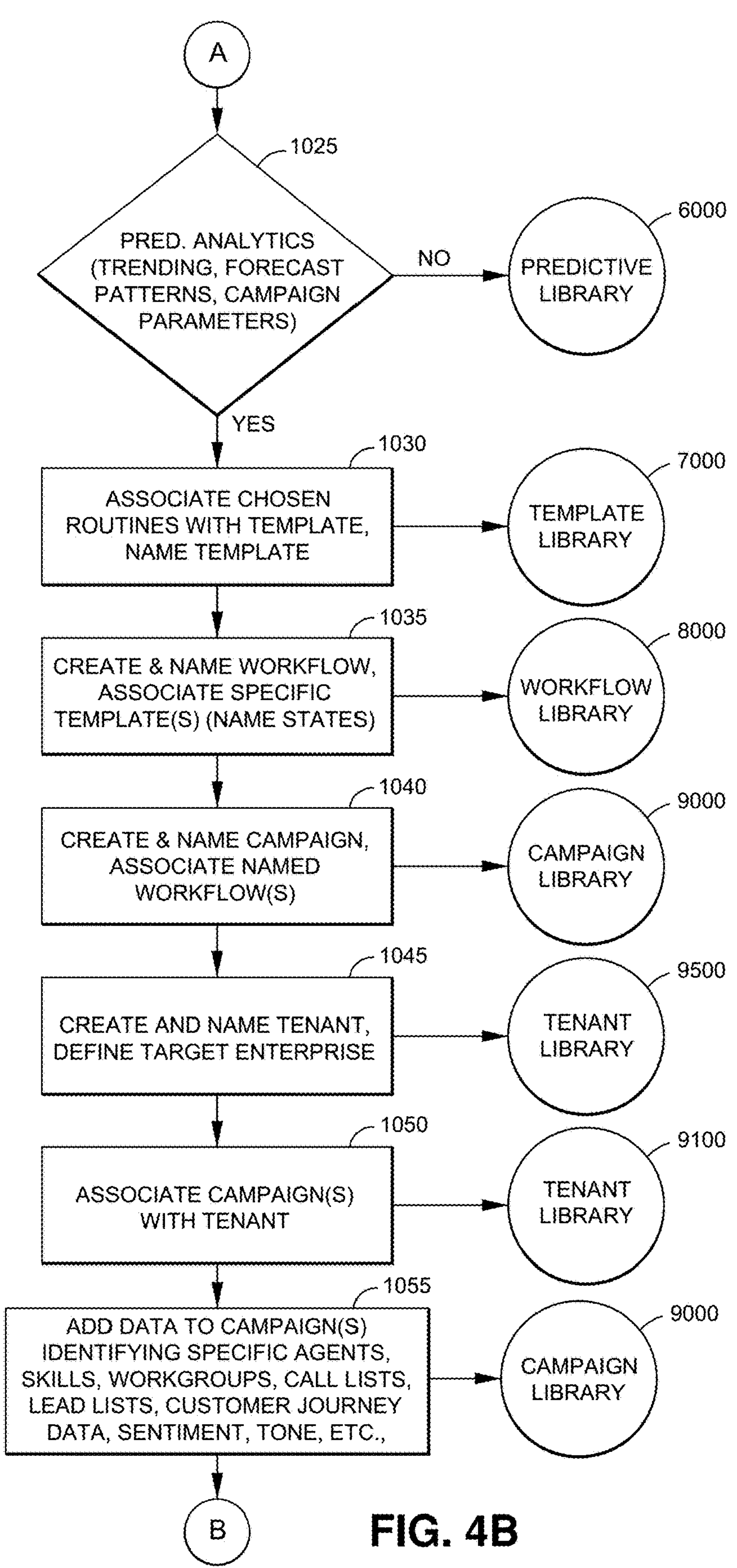
Figure 4C:
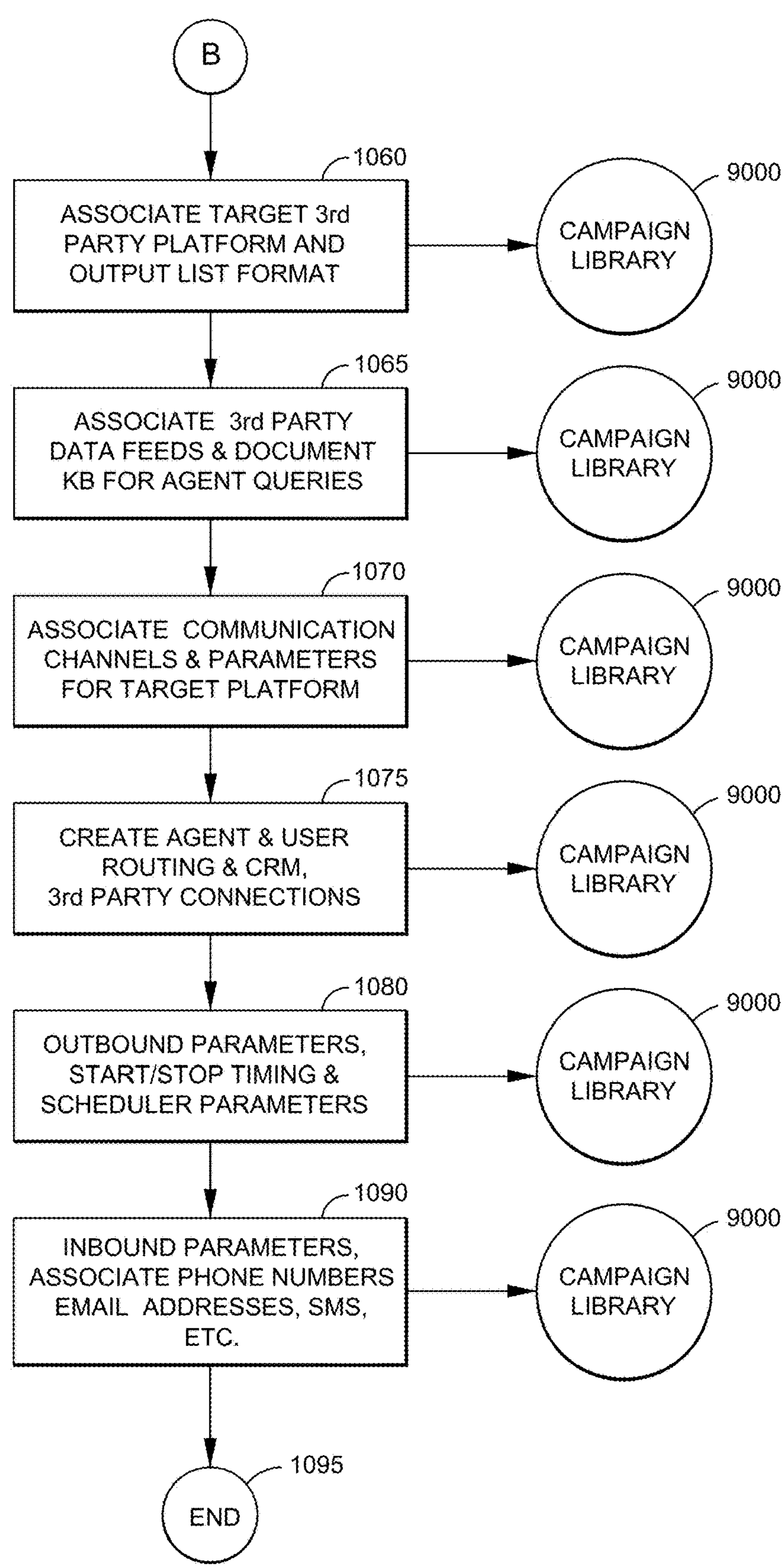

FIG. 4, which is split into FIGS. 4A, 4B, and 4C as illustrated, shows an example logic flow 1000 for provisioning of AI templates, workflows, campaigns, and tenants by the AI-based Compliance & Preference Service 100. It is important to note that while the description here of steps in the provisioning of AI templates, workflows, campaigns, tenants, etc. are shown here as sequential, it is not strictly necessary to execute these steps in a particular order. The provisioning of AI templates, workflows, campaigns, tenants, and related attributes may support the implementation of the disclosed subject matter as an "AI overlay network" that interfaces with non-AI target systems to provide certain value-added functions.

For example, aspects of the disclosed embodiments may include the ability to a) define and store specific AI-based and/or decision engine routines that are further associated with a specific tenant by way of campaign instructions, b) associate specific instruction sets with customer-specific compliance or preference attributes, c) associate those specific AI-based and decision engine instruction sets within the logic of a specific workflow or campaign, d) link specific tenants, campaigns, and associated AI-based instruction sets to target legacy CRM, ACD, or dialer platforms, and e) define work items associated with a specific campaign. For example, a work item may be linked to a campaign and could include attributes such as KB (knowledge base) searches, customer value, preferences, etc.

Referring first to FIG. 4A, at step 1000, an example process of provisioning AI templates, workflows, campaigns, tenants, and application-specific AI instructions begins. The process may be performed by the AI-based Compliance & Preference Service 100, but the AI-based Compliance & Preference Service 100 is not limited to using this process.

At step 1005, the practitioner of the AI-based Compliance & Preference Service 100 may invoke the use of the AI intelligence services 114 described in FIG. 3 in order to define "Intent" for transcribed text to search and index for compliance phrases. A person familiar with JavaScript or other languages may do this using 3rd party AI services such as those available from Google api.ai, IBM bluemix, MindMeld, Vital A.I., KAI, and Rainbird. Such compliance phrases may vary significantly on a tenant-by-tenant basis, and in fact within one tenant on a campaign-by-campaign basis. Examples of a compliance phrase in the context of an over-the-phone dialog between a customer and an agent may be a question about the customer's authority to conduct a transaction such as "Are you an adult over the age of 18?" or "Are you the account holder with the authority to make this purchase?"

Defining "intent" may refer to the ability of an AI routine to figure out the goal that is in mind of the speaker. A dialog for which text may be transcribed may have two speakers: a) the "agent" or representative, who may be a live representative or an AI-based robot or so-called bot, and b) the "customer." A relatively simple example of intent-based AI programming is the characterization of short utterances. For example, an AI engine can be programmed to characterize the intent of "nu-uh," "nope," or "nah" as being contrary or negative. Regarding compliance phases, an AI engine can be programmed to transcribe spoken words into text and then to further single-out specific phrases such as "this call may be recorded," or "this call is an attempt to collect a debt." In a compliance phrase scenario, the intent of the first dialog may be to establish a recording disclosure, and the intent of the latter may be to establish the primary purpose of the call, that is, to collect money.

Further, intent may be a two-way concept in a dialog between two people or between one person and a robotic agent or bot. With regard to the intent of the customer, the intent may be determined by using AI to examine words and phrases. For example, a customer may say, "I want to get a partial refund on the product that was shipped to me because I paid for overnight shipping but it took two days to get to me." Here, the intent is multifaceted: first the customer has an intention to lodge a complaint about a late shipment, and second the customer is seeking remuneration. The agent may say in response, "We are sincerely sorry that your product arrived late. Let me process a refund for the difference . . . ." In this example of an agent response to the initial dialog from the customer, the intent of the agent may be to comfort the customer. In another example, the agent may cite policy or try to get out of paying a refund to the customer: "I'm sorry, our policy does not include partial refunds for late shipments, as the order form clearly states we are not responsible for the carrier being late." Here, the intent of the agent may be to refute the assertion of the customer.

As described in detail in relation to the previous figures, the AI-based Compliance & Preference Service 100, as implemented, may have access to a plurality of data sources, all of which can be stored and made accessible to the practitioner in creating AI-based routines. The examples cited here are in no way meant to limit the variety and breadth of data that can be used to create the AI-based routines described here in relation to FIG. 4.

In a preferred embodiment of the disclosed subject matter, compliance phrases that are targeted for use in a specific campaign will be tagged or labeled as such at this step 1005, with the resulting tagged/labeled AI routine stored in a compliance AI library 2000. As with all of the other libraries mentioned here in the description of FIG. 4, such libraries may be stored in in-memory cache or in a database as described in relation to FIGS. 1 and 3. The AI routine stored in the compliance AI library 2000 can be created and/or edited using an administrative UI as described in FIGS. 1 and 3 (e.g. an administrative UI associated with the administrative interface service/proxy 116 and/or primary reports & analytics & admin portal 225).

At step 1010, the practitioner of the AI-based Compliance & Preference Service 100 may invoke the use of the AI intelligence services 114 described in relation to FIG. 3 in order to define "AI classifiers" based on forensic patterns. Such patterns are typically manifest in bodies of text but may also be applied to objects. A person familiar with JavaScript or other languages may do this using the aforementioned 3rd party AI services. These "AI Classifiers" may vary significantly on a tenant-by-tenant basis, and in fact within one tenant on a campaign-by-campaign basis. A common AI classifier such as the Naïve Bayesian classifier will be well known to someone familiar with AI software. Classification using AI typically involves several steps, for example, feature transformation, classifier specification, classifier estimation, and feature selection. An example of how these steps can be used in building a forensic pattern library may include a "Best Time to Call" (BTTC) routine that will search for known calling patterns, time zones, customer demographic information, and related attributes. Such a routine may further be associated with a specific campaign or outbound telephone call list in order to intelligently order the timing of when calls are placed to certain customers.

For example, a BTTC routine may be a calculation of the optimal time to call a customer based on various inputs that can be considered. For example, regulatory statutes may dictate when you are not allowed to call customers in each state, such as before or after certain hours of the day or during certain state or region-wide emergencies. This information can be compiled and an algorithm can be used to determine "black out periods" when NOT to call. By process of elimination, a calculation for the BEST time to call can be contemplated. In addition, demographic data may be used to determine the best time to call including socio-economic data associated with the zip code of the customer, for example. Job types and occupational data can be compiled to understand when, on average, people who live in a certain neighborhood are more likely to be at home or not at work and therefore more likely to answer the phone. In addition, the calling pattern and historical records of previous interactions with the specific customer can be used to suggest the best time to call. A BTTC routine can be used to amalgamate all of these data points to make a determination of the best time to call. It should be noted that, in the context of the term "BTTC," the word "call" is not intended to be limited to telephone calls and may include any kind of outreach to a customer, such as text messaging, email, etc.

In a preferred embodiment of the disclosed subject matter, "AI Classifier" routines such as the BTTC example above that can be targeted for use in a specific campaign will be tagged or labeled as such at this step 1010, with the resulting tagged/labeled AI routine stored in a BTTC AI library 3000. The AI routine stored in the BTTC AI library 3000 can be created and/or edited using an administrative UI as described in FIGS. 1 and 3 (e.g. an administrative UI associated with the administrative interface service/proxy 116 and/or primary reports & analytics & admin portal 225).

It is instructive to note that the disclosed subject matter is in no way limited to using the "AI Classifier" routine described here solely for BTTC. In fact, the "AI Classifier" routine of step 1010 could just as easily be used to predict preferences on a customer-by-customer basis. For example, data made available by the primary branded compliance forms, feedback web site/mobile app 220, as described in relation to FIG. 1, could be analyzed as part of an "AI Classifier" routine. Similarly, such a routine may be used to analyze feedback and sentiment from social network channels in order to be used in conjunction with agent-facing, or even BOT-consuming answers to certain questions about a subject people are interested in hearing about.

At step 1015, the practitioner of the AI-based Compliance & Preference Service 100 may invoke the use of the AI intelligence services 114 described in relation to FIG. 3 in order to define "AI Classifiers" based on customer buying frequency, purchase volume, customer lifetime value, and other demographic attributes. Such patterns are typically manifest in bodies of text but may also be applied to objects. A person familiar with JavaScript or other languages may do this using the aforementioned 3rd party AI services. An example of how this step can be used in building a forensic pattern library may include a "Prioritization" routine that will search for buying patterns of a customer and other customer demographic information. Such a routine may further be associated with a specific campaign or outbound telephone call list in order to "rank" the order in which customers should be contacted, based on the patterns defined by the AI routine created here. Similarly, such a routine may be useful in identifying when a customer should receive more personalized service from the enterprise. For example, such personalization may include customized coupons, offers, or escalations to concierge-type services.

In a preferred embodiment of the disclosed subject matter, "AI Classifier" routines such as the "Prioritization" example here that can be targeted for use in a specific campaign will be tagged or labeled as such at this step 1015, with the resulting AI routine stored in the "Prioritization Library" 4000. The AI routine stored in the prioritization library 4000 can be created and/or edited using an administrative UI as described in FIGS. 1 and 3 (e.g. an administrative UI associated with the administrative interface service/proxy 116 and/or primary reports & analytics & admin portal 225).

At step 1020, the practitioner of the AI-based Compliance & Preference Service 100 may invoke the use of the AI intelligence services 114 described in relation to FIG. 3 in order to define "BOT Conversation" based on customer intents, dialog response, and related logic. Such automated dialogs are commonly implemented in the form of "Virtual Assistants" or "Chat Bots" and are well known to practitioners of AI and digital engagement platforms. A person familiar with JavaScript or other languages may do this using the aforementioned 3rd party AI services. Building a "BOT Conversation" may include accessing a document management system or KB (knowledge base) as described in FIGS. 1 and 3 (e.g. document management service 112 and/or 3rd party media system 215). Such a routine may further be associated with a specific web site landing page for sales or service and may incorporate previously known "correct" answers from a Frequently Asked Question (FAQ) list. As an example, an AI routine for "BOT Conversation" can be built around a Facebook business page, using historical answers to questions in the Facebook timeline of a particular enterprise as a "Document Management" corpus. In this specific example, the AI-based Compliance & Preference Service 100 can be used to completely automate "BOT Conversations" on a target Facebook business page. In this context, the example Facebook business page may constitute a 3rd party ACD, dialer, or CRM system 300 (e.g. as an element of CRM software).

In a preferred embodiment of the disclosed subject matter, "BOT Conversation" routines such as the Facebook business page example here that can be targeted for use in a specific campaign and will be tagged or labeled as such at this step 1020, with the resulting AI routine stored in the "BOT Library" 5000. The AI routine stored in the compliance BOT library 5000 can be created and/or edited using an administrative UI as described in FIGS. 1 and 3 (e.g. an administrative UI associated with the administrative interface service/proxy 116 and/or primary reports & analytics & admin portal 225).

Turning to FIG. 4B, at step 1025, the practitioner of the AI-based Compliance & Preference Service 100 may invoke the use of the AI intelligence services 114 described in relation to FIG. 3 in order to define "Predictive Analytics" based on historical and trending information, forecast patterns, campaign parameters, and related logic. Such predictive algorithms can be used to ascertain the efficacy of a marketing campaign, or response to a product recall action. A person familiar with JavaScript or other languages may do this using the aforementioned 3rd party AI services.

An example of how this step can be used is in building an automated means to edit customer feedback forms. This may incorporate and influence the content of forms on the primary branded compliance forms, feedback web site/mobile app 220, as described in FIGS. 1 and 3. Such a routine may further be associated with a specific web site landing page for sales or service, and may be used to augment customer reach-out in the form of chat dialogs, outbound SMS communications or phone calls. As a specific example, the AI-based Compliance & Preference Service 100 can be used to completely automate the update of campaigns associated with specific tenants on a campaign-by-campaign basis.

In a preferred embodiment of the disclosed embodiments, "Predictive Analytics" routines such as the automatic updates suggested here can be targeted for use in a specific campaign and will be tagged or labeled as such at this step 1020, with the resulting AI routine stored in the "Predictive Analytics" library 5000. The AI routine stored in the compliance predictive library 5000 can be created and/or edited using an administrative UI as described in FIGS. 1 and 3 (e.g. an administrative UI associated with the administrative interface service/proxy 116 and/or primary reports & analytics & admin portal 225).

At step 1030, the routines that have been stored thus far in either, all, or some of the compliance AI library 2000, BTTC AI library 3000, prioritization library 4000, BOT library 5000, or predictive library 6000 may be associated with a template and then stored as a named template in a template library 7000. In this way, the AI-based Compliance & Preference Service 100 or a practitioner thereof may store a plurality of AI templates, each of which is associated with one or more AI routines (e.g. selected from among the AI routines stored in the libraries 2000, 3000, 4000, 5000, 6000). Such templates may also be referred to as name states for the purposes of building and editing workflows as described below. In a preferred embodiment of the disclosed subject matter, named templates stored in the template library 7000 may be stored in in-memory cache or in a database as described in FIGS. 1 and 3. The definition of templates and the naming of templates (step 1030) can be created and edited via an Administrative UI as described in FIGS. 1 and 3 (e.g. an administrative UI associated with the administrative interface service/proxy 116 and/or primary reports & analytics & admin portal 225).

At step 1035, a provisioning step of associating specific templates from the template library 7000 with named workflows may occur. Here, the practitioner may create name states using an administrative UI as described in FIGS. 1 and 3 (e.g. an administrative UI associated with the administrative interface service/proxy 116 and/or primary reports & analytics & admin portal 225). Defining a workflow refers to chaining logical events in order to establish a programmatic routine that can be executed by the AI-based Compliance & Preference Service 100. A practitioner with average skill in computer programming using JavaScript and HTTP will be familiar with open source software that allows for the creation of workflows. For example, jsWorkFlow and NoFloJs are popular tools.

An example of a workflow illustrating one aspect of the disclosed subject matter would be to follow these steps in anticipation of loading and transmitting an AI-based list to a 3rd party dialer: a) load target customer list into memory, b) run a specific named AI template consisting of an AI routine from the compliance AI library 2000 against the target list, c) run a specific named AI template consisting of an AI routine from the BTTC AI library 3000, d) output the resulting AI-based list from steps b and c into a data file stored in the database 105, c) invoke the use of the decisioning & workflow engine 115 to assert rules pertaining to time of day, compliance restrictions, and other attributes to tag the list entries appropriately, and f) transmit the list generated in step d to the list services gateway 107 (for connection to a specific target 3rd party dialer 300).

The above example workflow is cited here for illustrative purposes only and is not meant to restrict the various routines that could be contemplated by the practitioner of the AI-based Compliance & Preference Service 100. Literally thousands of workflows may be documented in similar fashion, ranging from workflows governing BOT use on a Facebook business page, to workflows for prioritizing lists based on customer lifetime value scores, to workflows for sending custom objects or instructions to a 3rd party CRM or campaign management software to automate coupon offers or follow-up SMS messages to customers.

Once named states and workflow are documented in this step 1035, the resulting named workflows may then be stored as workflow objects in a workflow library 8000. In subsequent steps described below, such workflow objects may thereafter be associated with tenants and tenant-specific campaigns for execution.

At step 1040, the practitioner of the AI-based Compliance & Preference Service 100 may create and name a specific campaign and then associate that campaign with one or more named workflows accessible via the workflow library 8000. The definition of campaigns and the naming of campaigns (step 1040) can be created and edited via an Administrative UI as described in FIGS. 1 and 3 (e.g. an administrative UI associated with the administrative interface service/proxy 116 and/or primary reports & analytics & admin portal 225). A practitioner with average skill in JavaScript programming and HTML can use standard programming routines to get selected values from drop-down lists, checkboxes and text boxes to assemble all of the requisite data for creating and naming a specific campaign. Likewise, commonly available programming tools can be used to create pick lists so the administrator of the system can further associate the named campaigns with objects in the workflow library 8000. These same methods may be applied to subsequent steps in the provisioning of AI templates, workflows, campaigns, tenants, and other aspects of the process of FIG. 4.

At step 1045, the practitioner of the AI-based Compliance & Preference Service 100 may create and name a specific tenant and then associate the tenant with a specific target tenant enterprise. The aforementioned examples and methods for using an administrative UI for capturing this data may also apply to this step. While "tenant" and "tenant enterprise" may sometimes be used interchangeably throughout this disclosure, a "tenant" may typically refer to a defined user of software in the context of sales, customer service, and marketing services software, whereas a "tenant enterprise" or "enterprise" may refer to a business entity or other enterprise associated with the user. Such tenant enterprises may be customers of the AI-based Compliance & Preference Service 100.

It is a standard practice in the contact center, digital engagement, and CRM industries to partition tenants in a database and in the tenants' use of system routines, so security and privacy can be maintained, not allowing any of the data related to that tenant to be shared by another tenant. An extension of the tenant concept is further contemplated in step 1045 in that the practitioner of the AI-based Compliance & Preference Service 100 may associate the named tenant with a particular enterprise customer of the AI-based Compliance & Preference Service 100. Once this association is established, using pick lists, drop-downs, etc. as described above, the resulting template or object is stored in the tenant library 9500.

At step 1050, the practitioner of the AI-based Compliance & Preference Service 100 may associate specific stored campaigns with specific tenants. For example, from among the objects and templates that are available from the AI template library 7000, the workflow library 8000, the campaign library 9000, and the tenant library 9100, the practitioner may associate a campaign from the campaign library 9000 with a tenant from the tenant library 9100. The resulting association may be stored as an update to the templates and objects already stored in the tenant library 9100.

By the above steps 1030-1050, the AI-based Compliance & Preference Service 100 or a practitioner thereof may generate a campaign object associating one or more of the AI templates with a tenant enterprise from among a plurality of tenant enterprises (e.g. customers of the AI-based Compliance & Preference Service 100). In this regard, it is noted that the creation of the campaign object may be simultaneous with or after the association of AI templates with campaigns described in relation to step 1040. For example, in the example sequence of steps shown, it is not until later that the campaigns in the campaign library 9000 are associated with specific tenant enterprises. For example, a campaign for announcing a new product may be created generically and only later tailored to a specific business. However, as noted above, the disclosed subject matter is not limited to the particular sequence of steps illustrated. For example, instead of first associating workflows (including AI templates) with a campaign (step 1040) and thereafter associating the campaign with a tenant enterprise (steps 1045, 1050), it is contemplated that a campaign may be initially associated with a particular tenant enterprise and thereafter associated with workflows (including AI templates). Moreover, in either case, it is further contemplated that AI templates may be associated with a campaign directly without first being organized into workflows (step 1035). Thus, according to various contemplated methods, the AI-based Compliance & Preference Service 100 or a practitioner thereof may generate a campaign object associating one or more of the AI templates with a tenant enterprise from among a plurality of tenant enterprises.

At step 1055, further curation of an existing campaign is contemplated. Here, the practitioner of the AI-based Compliance & Preference Service 100 may have the ability to add information pertaining to agents (customer service agents, sales agents, collection agents, etc.). For example, the input of data such as an agent name, agent telephone number, agent email address, agent SIP address, may be added and stored here. The working knowledge agents have in the form of skills, and skills proficiency may also be added and stored here, along with the way in which agents are grouped together to form a workgroup or skill group.

Non-agent related information may also be incorporated into the campaign. For example, the tagging and identification (either by file name, location, URL, etc.) of callout lists, lead lists, customer lists may occur in this step along with the association of such lists with the particular campaign. In addition, data relating to customer experience and forensic data including historical and real time customer journey data, customer sentiment data, customer persona data, CRM records, and other data such as demographic information and behaviors that can be collected and stored about each customer may further be associated with the campaign.

Once all of the relevant agent and non-agent data has been assembled and associated with a particular campaign, the information and associations of that information may be stored in the campaign library 9000.

Turning to FIG. 4C, the method may continue with step 1060, in which additional data relating to a particular campaign may be identified, associated with that campaign and likewise stored in the campaign library 9000. For example, the identification of specific 3rd party ACDs, dialers, CRM systems, and/or digital engagement platforms 300 can be linked here. Campaigns can be linked to these 3rd party systems in a variety of ways, for example, by a stored procedure, database query, IP address, URL, file location or API call. In addition, the specific format required for file exchange for each target 3rd party platform can be stipulated at this step. The practitioner of the AI-based Compliance & Preference Service 100 will recognize that the example 3rd party systems mentioned here may have published APIs and connector instructions that enable them to import, upload, or otherwise use lists from non-native platforms. The specific parameters and settings required for each list against its associated target 3rd party platform may therefore be defined in this step and stored in the campaign library 9000.

At step 1065, additional data relating to a particular campaign may be identified, associated with that campaign and likewise stored in the campaign library 9000. For example, the identification of specific 3rd party data feeds or data sources can be linked here. Campaigns can be linked to these 3rd party data sources in a variety of ways, for example, by a stored procedure, database query, IP address, URL, file location or API call. In addition, the specific format required for file exchange for each target 3rd party data source can be stipulated at this step. The practitioner of the AI-based Compliance & Preference Service 100 will recognize that the example 3rd party data sources mentioned here may have published APIs and connector instructions that enable other parties to interface. The specific parameters and settings required for each data source with respect to a particular campaign may therefore be defined in this step. Examples of data sources may include, but are not limited to, KB or document management systems, social firehose data feeds, customer records stored in a CRM system, data from an in-car telemetry system, etc. The breadth and type of data sources may be varied.

At step 1070, additional data relating to a particular campaign may be identified, associated with that campaign and likewise stored in the campaign library 9000. For example, the identification of specific communications channels to be associated with a particular campaign, as well as the "direction" (i.e. inbound vs. outbound) of those channels. Channels may include, but are not limited to, PSTN Voice, IP-based voice, chat, SMS, and email channels. All of the channels to be consumed by a campaign may be named and associated with the campaign here. Campaigns can be linked to these channels in a variety of ways, for example, via a RESTful HTTP command, a direct proprietary connection to another communications platform, or via WebHooks. In addition, the specific protocol required for each communication channel can be stipulated at this step. The practitioner will recognize that the example communications channels mentioned here are often provided by 3rd party media platforms, digital engagement platforms, chat platforms, and omni-channel ACDs. Most vendors of these platforms may have published APIs and connector instructions that enable other parties to interface with same. The specific parameters and settings required for each communications channel with respect to a particular campaign may therefore be defined in this step. The breadth and type of communications channels may be varied.

At step 1075, additional data relating to a particular campaign may be identified, associated with that campaign and likewise stored in the campaign library 9000. For example, the identification of routing rules associated with agents, agent groups, and queues can be linked here. Campaigns can be linked to these routing rules in a variety of ways. For example, campaigns can be linked to routing rules and other decisions by way of a stored procedure, database query, JSON or API call. In addition, the practitioner of the AI-based Compliance & Preference Service 100 will be able to associate routing rules and workflow instructions that may be passed to a 3rd party CRM or digital engagement system 300 here. The practitioner will recognize that many vendors of CRM platforms and digital engagement platforms will have published APIs and connector instructions that enable other parties to interface. The specific parameters and settings required for each CRM or digital engagement platform with respect to a particular campaign may therefore be defined in this step. The breadth and type of routing rules and CRM or digital engagement interfaces may be varied.

At step 1080, additional data relating to a particular campaign may be identified, associated with that campaign and likewise stored in the campaign library 9000. For example, the identification of Start/Stop timing and other scheduling can be linked here. As an example, and in the context of an OUTBOUND telephone-based telemarketing campaign, dialing lists may be defined together with stipulated start and stop times of the campaign and stipulated hours of the day that are blocked-off from calling. The data representing these start and stop times and other schedule-related data can be defined and stored here at this step. The practitioner of the AI-based Compliance & Preference Service 100 will further contemplate how such additional information may be consumed by the list services gateway 120 for subsequent processing and delivery to any number of 3rd party ACD, dialer, CRM or digital engagement platforms 300 as discussed in FIGS. 1 and 3.

At step 1090, additional data relating to a particular campaign may be identified, associated with that campaign and likewise stored in the campaign library 9000. For example, the identification of incoming phone numbers, SMSs, DNIS (Dialed Number Identification Service), target email addresses, and other incoming work items can be linked here. As an example, and in the context of an INBOUND telephone-based customer service campaign, a list of toll-free numbers associated with particular routing and agent skill groups can be defined, associated with a campaign, and stored here. In another example, the location of chat objects can be associated with a campaign and stored here. Such chat objects may be written in JavaScript so they can be incorporated into a target enterprise web site. At this step, the "location" by landing page, URL or another parameter may be associated and further stored here. The practitioner of the AI-based Compliance & Preference Service 100 will further contemplate how such additional information may be used to interface with 3rd party ACD, dialer, CRM or digital engagement platforms 300 that possess inbound work item processing capabilities.

At step 1095, the example logic flow described here as provisioning of AI templates, workflow, campaigns, and tenants concludes. Thereafter, with campaign objects having been defined associating AI templates with a plurality of tenant enterprises, the AI-based Compliance & Preference Service 100 may provide artificial intelligence (AI) functionality to target legacy customer outreach platforms of the plurality of tenant enterprises. For example, the AI-based Compliance & Preference Service 100 may transform a communication on a switching network 200, 205, 305 associated with a tenant enterprise according to the one or more AI templates associated with a corresponding campaign object and provide the transformed communication to a target legacy customer outreach platform 300 of the tenant enterprise. As a specific example, the communication may be an outbound communication from the tenant enterprise and the transforming may include scrubbing the communication, ranking the communication, and/or setting a communication medium for the communication (phone call, SMS, email, etc.) according to the one or more AI templates associated with the campaign object. As another specific example, the communication may be an inbound communication to the tenant enterprise and the transforming may include routing the communication according to the one or more AI templates associated with the campaign object.

In providing artificial intelligence (AI) functionality, the AI-based Compliance & Preference Service 100 may further modify a customer list according to the one or more AI templates associated with the campaign object and provide the modified list to the target legacy customer outreach platform 300 of the tenant enterprise. Modifying the customer list may include scrubbing the customer list in accordance with data from a national "do not call" database, a litigator database, and/or a regional rules database and/or adding customer data to the customer list from one or more media sources (e.g. Twitter, Facebook, etc.).

FIG. 5 shows an example data structure 10000 for provisioning of AI templates, workflows, campaigns, and tenants by the AI-based Compliance & Preference Service 100. The data structure 10000 may be stored in the database 105 of FIG. 3 and may represent the contents of one or more of the libraries described in relation to FIG. 4. For example, the data structure 10000 may represent a campaign object stored in the campaign library 9000. In the example of FIG. 5, the data structure 10000 is illustrated in tabular form to represent associations between various items of data as described in relation to FIG. 4. In particular, a single row of the data structure 10000 may correspond to a single campaign object associated with a customer outreach campaign of a tenant enterprise customer of the AI-based Compliance & Preference Service 100. Each such campaign object may have, for example, a campaign object ID 10100 identifying the campaign object, a tenant enterprise ID 10200 identifying a tenant enterprise and/or tenant associated with the campaign object (i.e. whose campaign it is), and a specification of one or more AI template(s) and/or workflow(s) 1030 including one or more AI routines (e.g. from among the various AI routines stored in the libraries 2000, 3000, 4000, 5000, and 6000). As such, the first three columns 10100, 10200, and 10300 of the data structure 10000 may represent the culmination of the process of FIG. 4 up through step 1050. Each campaign object may further be stored in association with agent data 10400, list data 10500, and customer experience data 10600 such as the data accumulated in step 1055 of FIG. 4, customer outreach platform data 10700 such as the data accumulated in steps 1060, 1070, and 1075, specification of data feeds 10800 as accumulated in step 1065, and additional campaign-related data 10900 such as the data accumulated in steps 1080 and 1090.

The disclosed embodiments are not intended to limit the practitioner from using any viable programming language, operating environment, run time engine, UI (user interface), form capture mechanisms, etc. in the implementation of the disclosed subject matter. The JavaScript and HTML examples cited herein are for illustrative purposes only and are not meant to restrict the methods the practitioner may employ to achieve the same or similar results.

Owing to the various combinations of features described throughout this disclosure, the disclosed AI-based Compliance & Preference Service 100 and related embodiments represent an improvement to conventional computer-implemented customer outreach systems. Such conventional systems only haphazardly automate limited aspects of managing a customer outreach campaign, leaving the management of regulatory compliance and customer preferences prone to human error as the various customer lists and campaign rules are manually updated. In contrast, the disclosed embodiments represent an entirely unconventional approach to managing customer outreach campaigns involving the creation of AI templates for use in retrofitting legacy customer outreach systems of diverse tenant enterprises and the transformation of inbound and outbound communications to and from such legacy systems according to the AI templates. Among the advantages of the disclosed embodiments relative to conventional systems is the capability of the AI-based Compliance & Preference Service 100 to globally implement updates automatically and in real time as regulations and customer preferences change.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-transitory program storage medium on which are stored instructions executable by a processor to perform operations for providing artificial intelligence (AI) functionality to target legacy customer outreach platforms of a plurality of tenant enterprises, the operations comprising:

storing a plurality of AI templates, each of which is associated with one or more AI routines;

generating a campaign object associating one or more of the AI templates with a tenant enterprise from among the plurality of tenant enterprises;

associating the campaign object with a file exchange format of a target legacy customer outreach platform;

transforming a communication on a switching network associated with the tenant enterprise according to the one or more AI templates associated with the campaign object; and providing the transformed communication to the target legacy customer outreach platform of the tenant enterprise.

* * * * *